US012693203B2

(12) United States Patent
Honaryar et al.

(10) Patent No.: US 12,693,203 B2
(45) Date of Patent: Jul. 28, 2026

(54) MAGNETICALLY COUPLED COLLECTING SYSTEM FOR FLOW CYTOMETRY AND CELL SORTER SYSTEMS

(71) Applicant: CYTEK BIOSCIENCES, INC., Fremont, CA (US)

(72) Inventors: Babak Honaryar, Fremont, CA (US); David Vrane, Fremont, CA (US); Peter Truong, Fremont, CA (US); Kuncheng Wang, Fremont, CA (US); Max Schwartz, Fremont, CA (US)

(73) Assignee: Cytek Biosciences, Inc., Fremont, CA (US)

( * ) Notice: Subject to any disclaimer, the term of this patent is extended or adjusted under 35 U.S.C. 154(b) by 330 days.

(21) Appl. No.: 17/665,489

(22) Filed: Feb. 4, 2022

(65) Prior Publication Data

US 2022/0252501 A1 Aug. 11, 2022

Related U.S. Application Data

(60) Provisional application No. 63/146,562, filed on Feb. 5, 2021.

(51) Int. Cl.
| | |
|---|---|
| *G01N 15/14* | (2024.01) |
| *G01D 5/14* | (2006.01) |
| *G01D 5/24* | (2006.01) |
| *G01D 5/347* | (2006.01) |
| *G01N 15/149* | (2024.01) |

(52) U.S. Cl.
CPC ............. *G01N 15/14* (2013.01); *G01D 5/142* (2013.01); *G01D 5/24* (2013.01); *G01D 5/347* (2013.01); *G01N 15/149* (2024.01)

(58) Field of Classification Search
None
See application file for complete search history.

(56) References Cited

U.S. PATENT DOCUMENTS

| | | | | | |
|---|---|---|---|---|---|
| 5,604,130 | A | * | 2/1997 | Warner | B01L 3/50851 |
| | | | | | 220/523 |
| 5,740,270 | A | * | 4/1998 | Rutenberg | G01N 15/1433 |
| | | | | | 600/300 |
| 5,925,956 | A | * | 7/1999 | Ohzeki | H02K 7/09 |
| | | | | | 318/135 |
| 10,197,480 | B2 | * | 2/2019 | Schaff | G01N 15/06 |
| 2002/0118362 | A1 | * | 8/2002 | Saccomanno | G01N 21/05 |
| | | | | | 356/246 |

(Continued)

OTHER PUBLICATIONS

NPI Springs, "V-Spring," Internet Archive Date of Jan. 29, 2019, https://www.npisprings.com/v-spring (Year: 2019).*

(Continued)

*Primary Examiner* — Kara E. Geisel
*Assistant Examiner* — Chad Andrew Reverman
(74) *Attorney, Agent, or Firm* — Alford Law Group, Inc.; Tobi C. Clinton

(57) ABSTRACT

A collecting system with a magnetically coupled sample mover is provided for flow cytometry and cell sorter systems. The collecting system uses magnets in a driver carriage to control the position of other magnets in a follower carriage. The driver carriage can thereby control the position of the follower carriage without physically touching the follower carriage.

26 Claims, 25 Drawing Sheets

(56) References Cited

U.S. PATENT DOCUMENTS

| | | | | |
|---|---|---|---|---|
| 2003/0089581 A1* | 5/2003 | Thompson | G01N 35/04 | |
| | | | | 198/619 |
| 2005/0194237 A1* | 9/2005 | Veiner | G01N 35/04 | |
| | | | | 198/619 |
| 2006/0216207 A1* | 9/2006 | Lehto | G01N 35/109 | |
| | | | | 422/510 |
| 2008/0236996 A1* | 10/2008 | Bausenwein | B41J 3/4071 | |
| | | | | 198/472.1 |
| 2014/0047962 A1 | 2/2014 | Giovanoli | | |
| 2014/0202829 A1* | 7/2014 | Eberhardt | B65G 35/00 | |
| | | | | 198/339.1 |
| 2015/0300932 A1* | 10/2015 | Schaff | G01N 15/042 | |
| | | | | 435/288.6 |
| 2017/0307502 A1 | 10/2017 | Mason et al. | | |
| 2018/0017590 A1* | 1/2018 | Diamond | G01N 35/025 | |
| 2020/0132590 A1* | 4/2020 | Dembski | G01N 15/1425 | |

OTHER PUBLICATIONS

Merriam-Webster Dictionary, "spring-load," First Known Use of the meaning defined from 1914, https://www.merriam-webster.com/dictionary/spring-load (Year: 1914).*
Rodriquez, Karl; PCT/US2022/015383; International Search Report; Jul. 1, 2022; 4 pages.
Rodriquez, Karl; PCT/US2022/015383; Written Opinion Of the International Searching Authority; Jul. 1, 2022; 8 pages.
Eurorpean Patent Office; App. No. 22750506.2; Extended European Search Report; Nov. 19, 2022; 8 pages.

* cited by examiner

FIG. 2C  Follower/Driven Carriage

156

Magnets 202

156

100

162

16

156a

In this embodiment five square Permanent Magnets (PM) are used, but any geometry magnet or number of magnets can also function, albeit with some performance differences. We can also use battery powered electromagnets 156c

506

504

510

Flexing arms accommodate the
variations in Microplate dimensions

406

506

510

506

Magnets have slight
interference with he
flexing arms

502

Push-fit between he
hollow pin and boss

508

PULL-PUSH MAGNET ARRANGEMENT

1100

1107

1109

152
156

154
158

1105

Four cube shaped magnets form a larger cube with two quadrants at opposite polarity of the other two quadrants 2D Alignment 1312

Rotationally Keyed Pattern 1302

Sliding Latch Pattern 1322

1300

The offset has already created a horizontal force to immediately start the Pull in the direction of movement, but because only half of the magnets have this built-in offset in the intended direction, stronger magnets must be used for this arrangement Offset is the same size as the Lag

1400

1406

1408

1402

1403

1404

1408

1400

1406

1400

166

1500

152

158

156

154

1502
Cantilever Springs provide flexible
mounting for the Separation Plate

306
Compression Spring ensuring
contact with the SP despite
potential non-coplanarities

166

Separation plate made out of materials with low COF and chemical resistance, but also requires wear resistance, low thermal conductivity and rigidity.

Carriage made out of material with lowest possible COF and good chemical resistance

Hall effect principle, magnetic field present

Bumps molded
or machined
into the same
material

2202

2200

2302
Bumps made out of a different material 156
158

2300

Compression Coil Spring

Extension Coil Spring

Constant-Force Drum Spring

Gas Spring or Foam Rubber Spring

Leaf or Cantilever Spring

Torsion Spring

MAGNETICALLY COUPLED COLLECTING SYSTEM FOR FLOW CYTOMETRY AND CELL SORTER SYSTEMS

CROSS-REFERENCE TO RELATED APPLICATIONS

This patent application claims the benefit of United States (US) Provisional Patent Application No. 63/146,562 titled LOADING SYSTEM WITH MAGNETICALLY COUPLED SAMPLE MOVER FOR FLOW CYTOMETRY AND CELL SORTER SYSTEMS filed on Feb. 5, 2021 by inventors Babak Honaryar et al., incorporated herein by reference for all intents and purposes.

FIELD

The embodiments of the invention relate generally to flow cytometry and cell sorter systems.

BACKGROUND

Flow cytometry and cell sorting involves the optical measurement of cells or particles of a test sample carried in a fluid flow. Cell sorting further sorts out the cells that are collected into different test tubes or wells of a collection tray for further usage or counting. The lab instruments that achieve these tasks are known as a flow cytometer and a cell sorter.

One or more test samples in one or more test tubes can be loaded by a loading mechanism and run through a flow cytometer/cell sorter in a single batch to gain efficiency in analyzing the types and quantities of cells or particles in the one or more test samples.

A collection tray or boat with a plurality of wells can be used to collect or receive the sorted cells/particles of the one or more test samples run through the flow cytometer by a collecting mechanism. The collection tray with its wells can be moved in order to collect or receive the different sorted cells/particles from the one or more test samples by the collecting mechanism.

It is desirable to avoid contaminating the sorted cells/particles in the wells of the tray with the unsorted cells/particles in the one or more test samples while moving the tray into the different positions to collect the sorted cells/particles into different wells. It is desirable to heat or air condition the sorted cells/particles in the different wells of the tray separate from the unsorted cells/particles in the test samples. It is also desirable to reduce the footprint of the flow cytometer/cell sorter so that more can be placed in a lab and on desktops. Accordingly, a more compact and more closed collection system is desirable to improve upon prior systems.

BRIEF SUMMARY

The embodiments are summarized by the claims. However, briefly, a collecting system with a magnetically coupled tray mover is provided for flow cytometry and cell sorter systems. The collecting system uses magnets in a driver carriage to control the position of other magnets in a follower carriage. The driver carriage can thereby control the position of the follower carriage without physically touching the follower carriage. The driver carriage and the follower carriage are separated by a separation plate and can be located in different environments. A collection tray with a plurality of wells can be removably coupled or mounted to the follower carriage so that it can be magnetically moved together with the follower carriage.

BRIEF DESCRIPTIONS OF THE DRAWINGS

Various embodiments are illustrated by way of example, and not by way of limitation, in the figures of the accompanying drawings.

FIGS. 2A-2D are diagrams of a first embodiment of a follower carriage in various perspective views.

FIG. 19B is a diagram of the Hall effect when a magnetic field is present from a magnet.

FIG. 19C is a chart of the magnetic flux sensed by a Hall effect sensor when a magnet that generates a magnetic field is moved across the Hall effect sensor.

It will be recognized that some or all of the Figures are for purposes of illustration and do not necessarily depict the actual relative sizes or locations of the elements shown. The Figures are provided for the purpose of illustrating one or more embodiments with the explicit understanding that they will not be used to limit the scope or the meaning of the claims.

DETAILED DESCRIPTION

In the following detailed description of the embodiments, numerous specific details are set forth. However, it will be obvious to one skilled in the art that the embodiments may be practiced without these specific details. In other instances, well known methods, procedures, components, and circuits have not been described in detail so as not to unnecessarily obscure aspects of the embodiments. The various sections of this description are provided for organizational purposes. However, many details and advantages apply across multiple sections.

Sorter System Overview

Figure 1A:
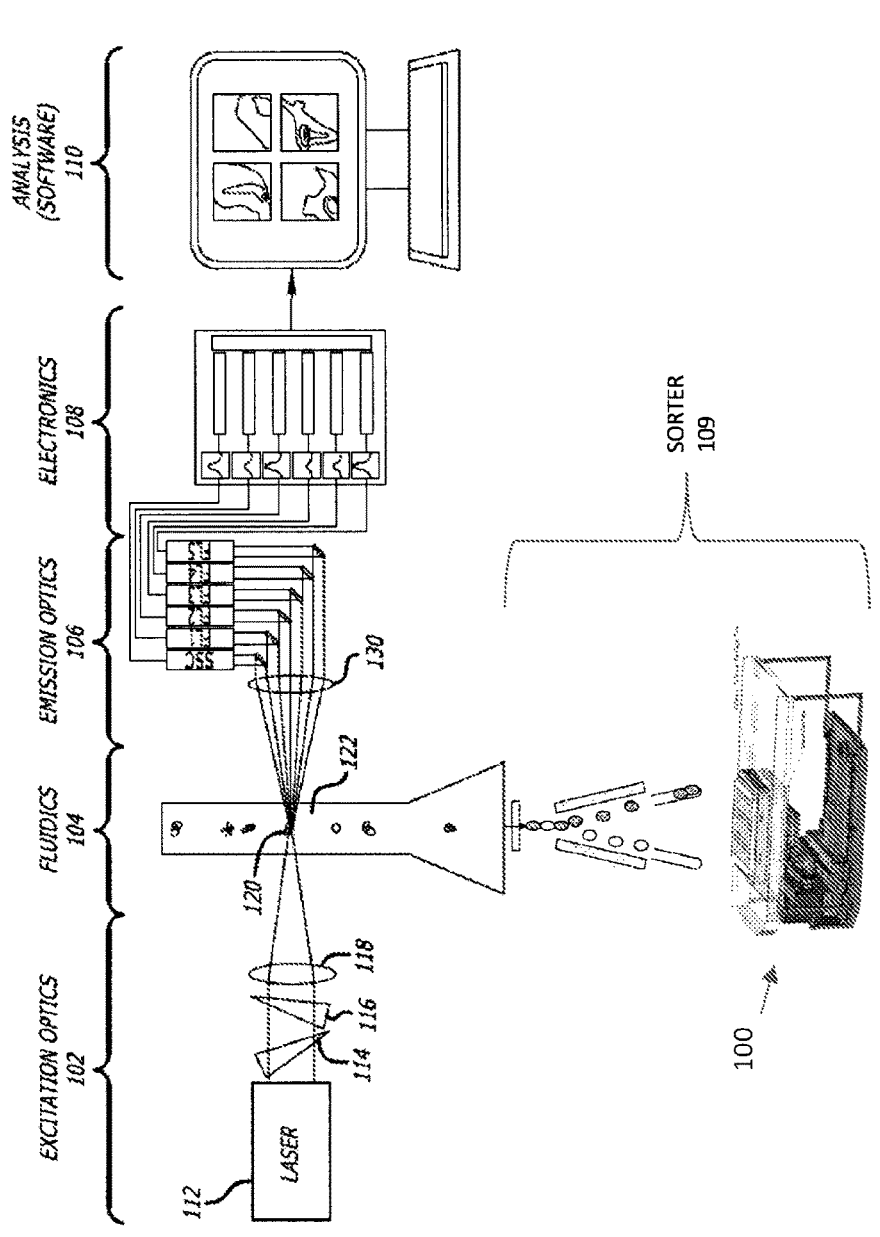
FIG. 1A is a basic conceptual diagram of a cell sorter system and a flow cytometer system is shown.

A collecting system with a magnetically coupled sample mover is provided for flow cytometry and cell sorter systems. FIG. 1A is provided to put the collecting system in context.

FIG. 1A is a basic conceptual diagram of a flow cytometer system 90 including a cell sorter system 109. Five major subsystems of the system 90 include an excitation optics system 102, a fluidics system 104, an emission optics system 106, an acquisition system 108, and an analysis system 110. The fluidics system 104 includes the cell sorter system 109. The cell sorter system 109 includes a collecting system 100. Generally, a "system" includes (electrical, mechanical, and electro-mechanical) hardware devices, software devices, or a combination thereof.

The excitation optics system 102 includes, for example, a laser device 112, an optical element 114, an optical element 116, and an optical element, 118. Example optical elements include an optical prism and an optical lens. The excitation optics system 102 illuminates an optical interrogation region 120. The fluidics system 104 carries fluid samples 122 through the optical interrogation region 120. The emission optics system 106 includes, for example, an optical element 130 and various optical detectors including a side scatter (SSC) channel detector, fluorescent wavelength range one (FL1) detector, fluorescent wavelength range two (FL2) detector, fluorescent wavelength range three (FL3) detector, fluorescent wavelength range four (FL4) detector, and fluorescent wavelength range five (FL5) detector. The emission optics system 106 gathers photons emitted or scattered from passing particles. The emission optics system 106 focuses these photons onto the optical detectors SSC, FL1, FL2, FL3, FL4, and FL5. Optical detector SSC is a side scatter channel. Optical detectors FL1, FL2, FL3, FL4, and FL5 are fluorescent detectors may include band-pass, or long-pass, filters to detect a particular and differing fluorescence wavelength ranges. Each optical detector converts photons into electrical pulses and sends the electrical pulses to the acquisition (electronics) system 108. The acquisition system 108, including one or more analog to digital converters and digital storage devices, processes and prepares these signals for analysis in the analysis system 110.

The disclosed embodiments are employed for the most part in the fluidics system 104 of a cell sorter system and a flow cytometer system. U.S. patent application Ser. No. 15/817,277 and U.S. patent application Ser. No. 15/942,430 disclose exemplary flow cytometer systems that are incorporated by reference. U.S. Pat. No. 9,934,511 discloses a cell sorter system that is incorporated herein by reference.

Collecting System Overview

The collecting system 100 includes one or more permanent magnets or electro-magnets to control the position of one or more follower magnets. The follower magnets are a small distance away from the driver magnets. A driver magnet paired with (e.g., physically opposing or physically mirroring) a follower magnet may be referred to as a magnet pair.

The driver magnet position can be controlled by several means including but not limited to the following: (1) electric-motorized positioning stage/table coupled to linear motors, positioning through lead-screw mechanisms, timing belt, drive belt mechanisms, cam-driven mechanisms, or linkage driven mechanisms; (2) pneumatically or hydraulically actuated arms or positioning mechanisms; and/or (3) manual positioning.

The follower magnet (also referred to as a driven magnet) is located at a small distance away, typically from about 0.1 mm to about 10.0 mm, separated from the driver magnet by a non-magnetic material (diamagnetic absent of paramagnetic and ferromagnetic). In one embodiment, non-magnetic materials maintain a strong and stable "coupling" between the driver magnet and the follower magnet. In another embodiment, the system 100 includes a paramagnetic material as the separation media.

The driver magnet is fixed to the final moving stage or table of a positioning mechanism. The follower magnet is fixed to an object whose physical position is to be controlled through the magnetic coupling. In one embodiment, one driver magnet and one follower magnet are the minimum requirement for a system 100. Using only two magnets can control the X-Y orientation. However, using several magnets can improve the repeatability and reliability of the coupling and therefore the position of the follower tray (collection tray).

Advantageously, a magnetically coupled positioning system 100 has the ability to place the follower object (e.g., follower carriage and/or collection tray) in a different environment than the driver mechanism by having the two environments separated by a barrier material. Such separation may be highly desirable in several situations. For example, the follower object may need to be in a temperature-controlled environment, while setting and maintaining the temperature for the driver mechanism may not be feasible or desirable. In another example, the follower object and its environment may be exposed to harsh chemicals or biologically hazardous materials. In such a situation, the material set and the geometry of the follower object along with its immediate/exposed environment can be selected and designed to be tolerant of these hazards. In a traditional system, it is costly to select materials and incorporate designs which can prevent damage to the components of the driver mechanism. Such damage occurs either directly or by necessitating disinfection and cleaning using aggressive chemicals and elaborate procedures. Fortunately, by separating the two environments from each other, the present system 100 can reduce cost and maintenance difficulty. The system 100 is designed to expose only the material set and the geometry of the environment of the follower to the aggressive elements.

A major application of this separation of environments is in cell sorting using flow cytometry technologies. A cell can be a pathogen but may miss its target in a sorter, thereby requiring aggressive disinfection and cleaning. Also, the cells often require a temperature-controlled chamber, which is easier to implement if the components of a driver mechanism including the heat generating motors are isolated from the temperature-controlled chamber. Additionally, the high-precision parts used in a positioning mechanism can change dimensions due to the set temperatures, potentially compromising the accuracy and reliability of these components. The cells are often sorted into the wells of a microplate with, for example, 96 or 384 wells per microplate. This microplate can be fixed to a follower magnet carriage/palette residing in the controlled chamber.

Architecture of Collecting System

Figure 1B:
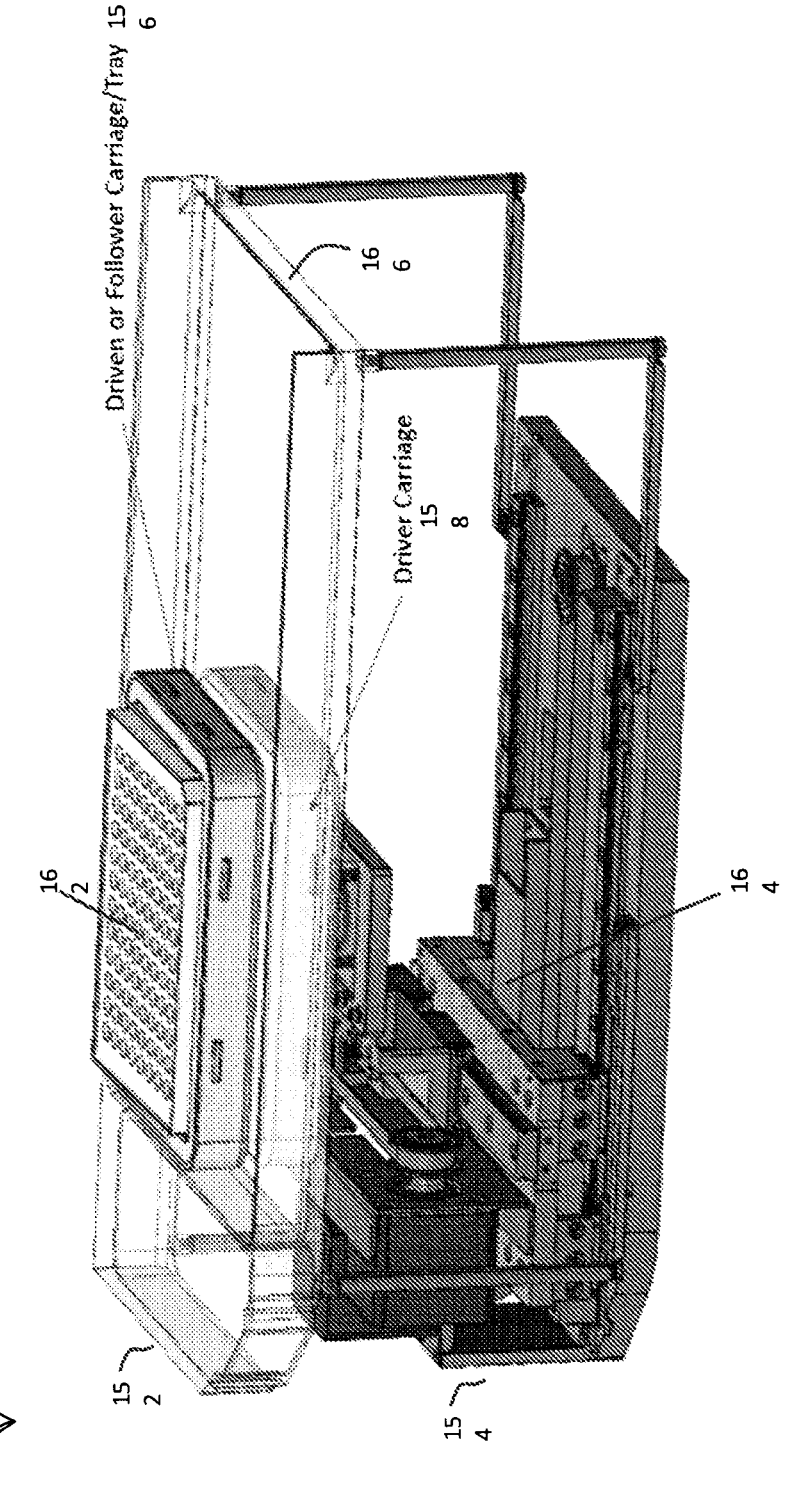
FIG. 1B is conceptual diagram of the collecting system with a magnetically coupled sample mover.

FIG. 1B is conceptual diagram of the collecting system 100 with a magnetically coupled sample mover. The system 100 includes, without limitation, the following components: a top chamber 152, a bottom chamber 154, a follower carriage 156 (aka, driven tray), a driver carriage 158 (aka, driving tray), a positioning stage 160 (aka, driver stage or driving stage), a microplate 162, and an X-Y move mechanism 164.

The positioning stage 160 dictates the position of the driver carriage 158 in an X-Y coordinate system (e.g., position on a plane). The follower carriage 156 on top of the top chamber 152. The follower carriage 156 nests and carries the microplate 162. The microplate 162 includes wells for receiving a sorting of cells (e.g., blood cells) exiting a nozzle of a flow cytometer. The microplate 162 may include, for example, 96 or 384 wells. This microplate 162 can be fixed to the follower carriage 156, which resides in the controlled environment of the top chamber 152.

FIGS. 2A-2D are diagrams of the follower carriage 156 in various perspective views. In one embodiment of the follower carriage 156, five square magnets 202 are coupled to the bottom of the follower carriage 156. However, any geometry of magnets or number of magnets is permissible, depending on the performance requirements. The follower carriage 156 can use permanent magnets. The follower carriage 156 can also, or alternatively, use electromagnets that are electrically powered via battery or another power source. The driver carriage 158 (not shown in FIG. 2) may include attracting/repelling magnets that mirror the geometry and number of the magnets coupled to the follower carriage 156.

Figures 2A, 2B, 2D:
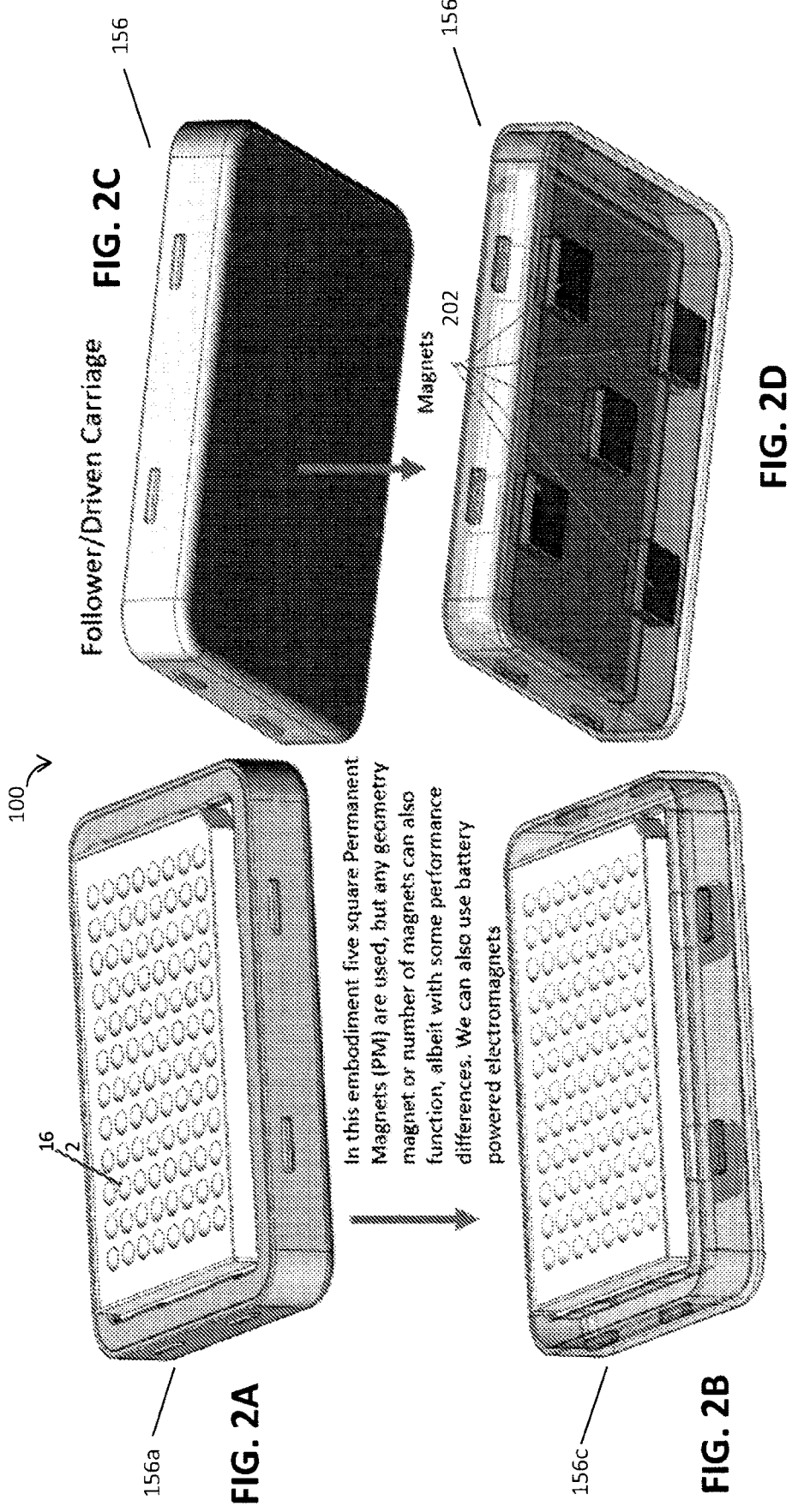

Perspective 156a, FIG. 2A shows a top perspective view and FIG. 2C shows a bottom perspective view of the follower carriage 156 without with magnets hidden from view. FIG. 2B shows a top perspective view and FIG. 2D shows a bottom perspective view of the follower carriage 156 showing five (5) magnets 202 inside the follower carriage 156. The five magnets 202 located inside can be coupled to the bottom of the follower carriage 156.

Figure 3:
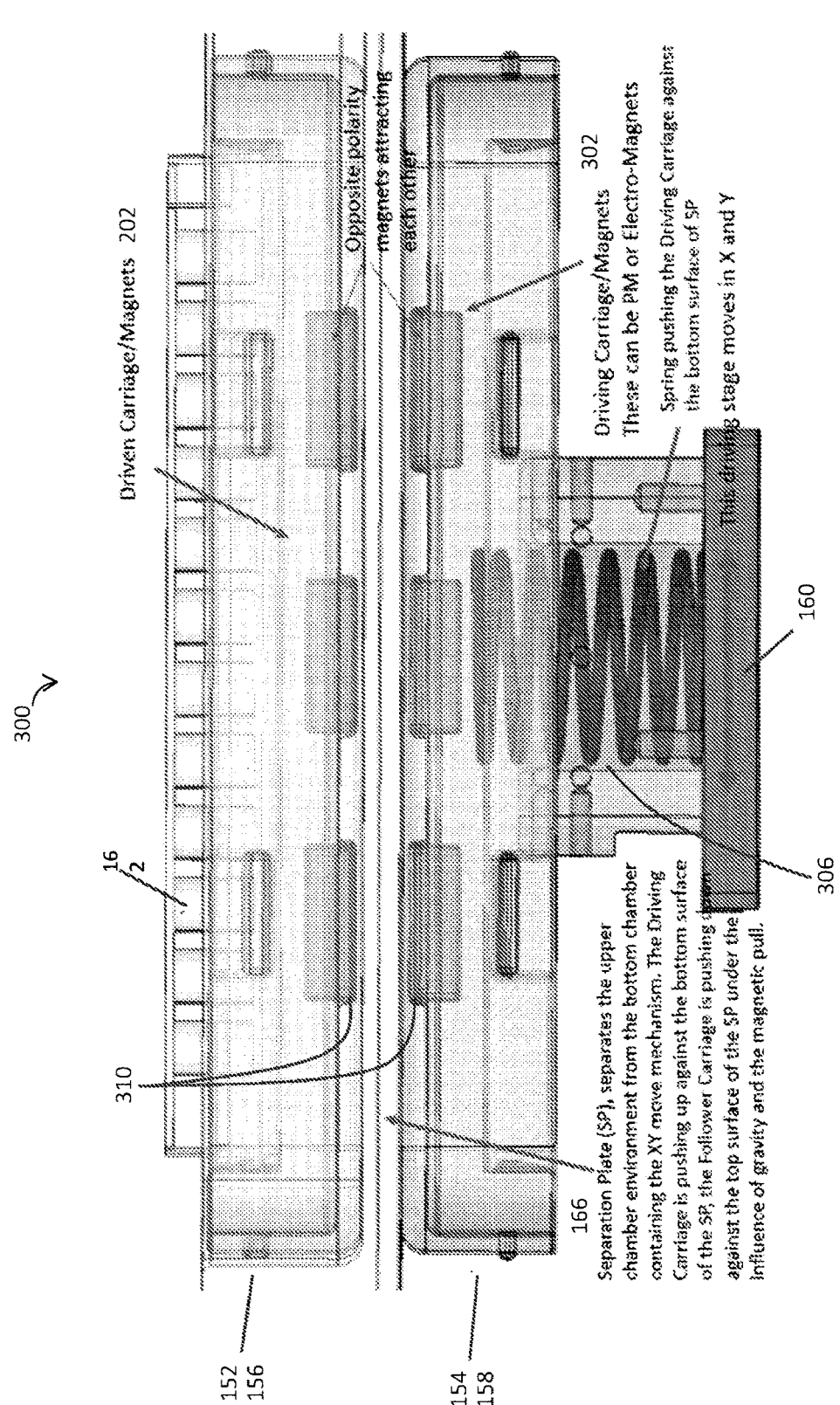
FIG. 3 is a cross-sectional view of a magnetically coupled mover for the collecting system.

FIG. 3 is a cross-sectional view of a magnetically coupled mover 300 for the collecting system 100. The mover 300 includes, without limitation, the following components: the follower carriage 156, the driver carriage 158, the positioning stage 160, the follower magnets 202 (aka, driven magnets), driver magnets 302 (aka, driver magnets), a separation plate 166, and a compression spring 306. The separation plate 166 separates an upper chamber environment (top chamber 152) from a lower chamber environment (bottom chamber 154).

The driver carriage 158 includes one or more magnets 302 mounted on a top side of the driver carriage 158. The follower carriage 156 includes one or more magnets 202 mounted on a bottom side of the follower carriage 156. The one or more magnets 302 of the driver carriage 158 are paired with the one or more magnets 202 of the follower carriage 156.

A magnet pair 310 includes a driver magnet 302 paired with a follower magnet 202. In a magnet pair 310 the driver magnet 302 is physically opposing and/or physically mirroring a corresponding follower magnet 202. In a magnet pair 310, the driver magnet 302 and the follower magnet 202 can have the same polarity (e.g., repelling each other) or the opposite polarity (e.g., attracting each other).

The separation place 304 separates the top carriage 152 from the bottom carriage 154, which contains the X-Y move mechanism 164. The X-Y move mechanism 164 moves the positioning stage 160 in X-Y coordinate system. The driver carriage 158 pushes against a bottom surface of the separation plate 166. In particular, the compression spring 206 is coupled to the positioning stage 110 pushes the driver carriage 158 against the bottom surface of the separation plate 166. The follower carriage 156 pushes down against a top of the separation plate 166 under an influence of gravity. The push of the follower carriage 156 is also influenced by a magnetic pull between the follower magnets 202 and the driver magnets 302. Each follower magnet 202 can be a permanent magnet or an electro-magnet. Each driver magnet 302 can be a permanent magnet or an electro-magnet.

Figure 4:
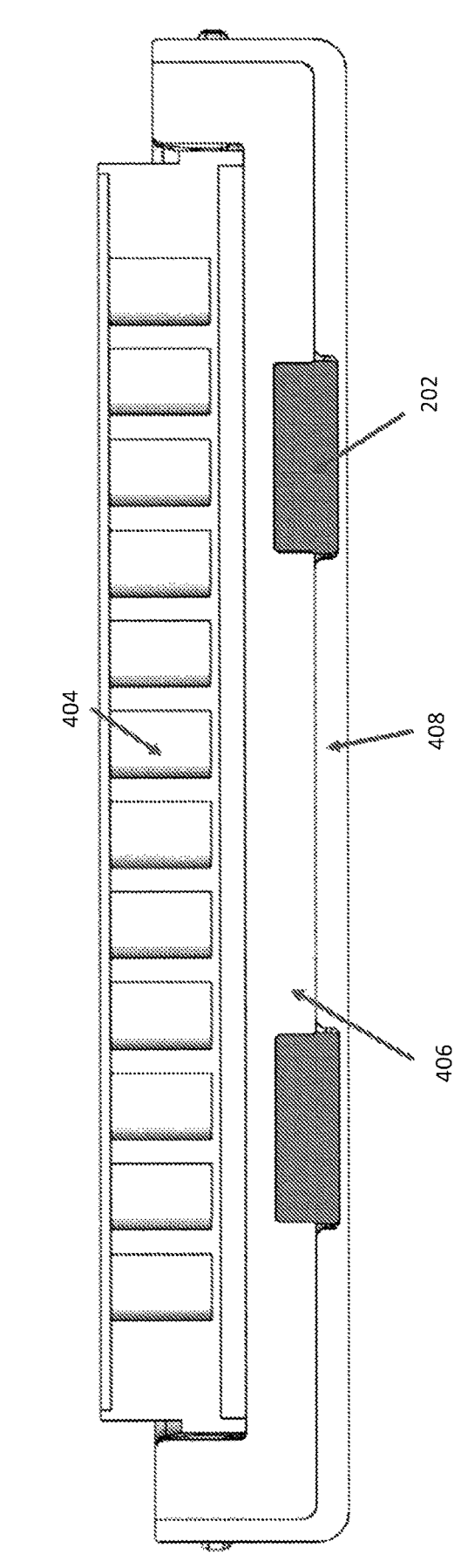
FIG. 4 is a cross-sectional sideview of the follower carriage.

FIG. 4 is a cross-sectional sideview of the follower carriage 156. The follower carriage 156 includes, without limitation a microplate 404, a rubber adapter 406, a carriage sleeve 408, and magnets 202.

The microplate 404 nests inside the rubber adapter 406, which helps minimize interference between the microplate 404 and other components of the follower carriage 156. The rubber adapter behaves like a buffer or shock absorber and can help isolate the microplate 404 from unwanted noise vibrations of the follower carriage 156. The microplate thereby experiences minor interference.

In one embodiment, the rubber adapter 406 is fluorosilicone, which is desirable for chemical resistance and a low compression set. The rubber adapter 406 can be molded, cast, or machined into a frozen state. In one embodiment, the carriage sleeve 408 is a slippery non-magnetic and chemically resistant material, for example, PTFE (polytetrafluoroethylene), CTFE (chlorotrifluoroethylene), PEEK (polyether ether ketone), PPSU (polyphenylsulfone), PP (polypropylene), etc. Magnets 202 have interference fit with the rubber adapter to drive the rubber adapter 406. The rubber adapter 406 in turn drives the microplate 404 along with the carriage sleeve 408.

There are many designs and architectures for a follower carriage 156, which enables the magnets 202 to dictate the position of the nested microplate 404. The follower carriage 156 of FIG. 4 is a simple form with few or no moving parts. The follower carriage 156 includes two fabricated parts: the molded rubber adapter 406 and the machined or compression molded carriage sleeve 408. Assembly of the follower carriage 156 is achieved by the interference fit between the rubber adapter 406, the carriage sleeve 408, and the magnets 202. No tools or fasteners are typically required for assembly.

Alternative Architectures

An alternative architecture may include all, some, or none of the parts of the collecting system 100.

Figures 5A, 5B, 5C:
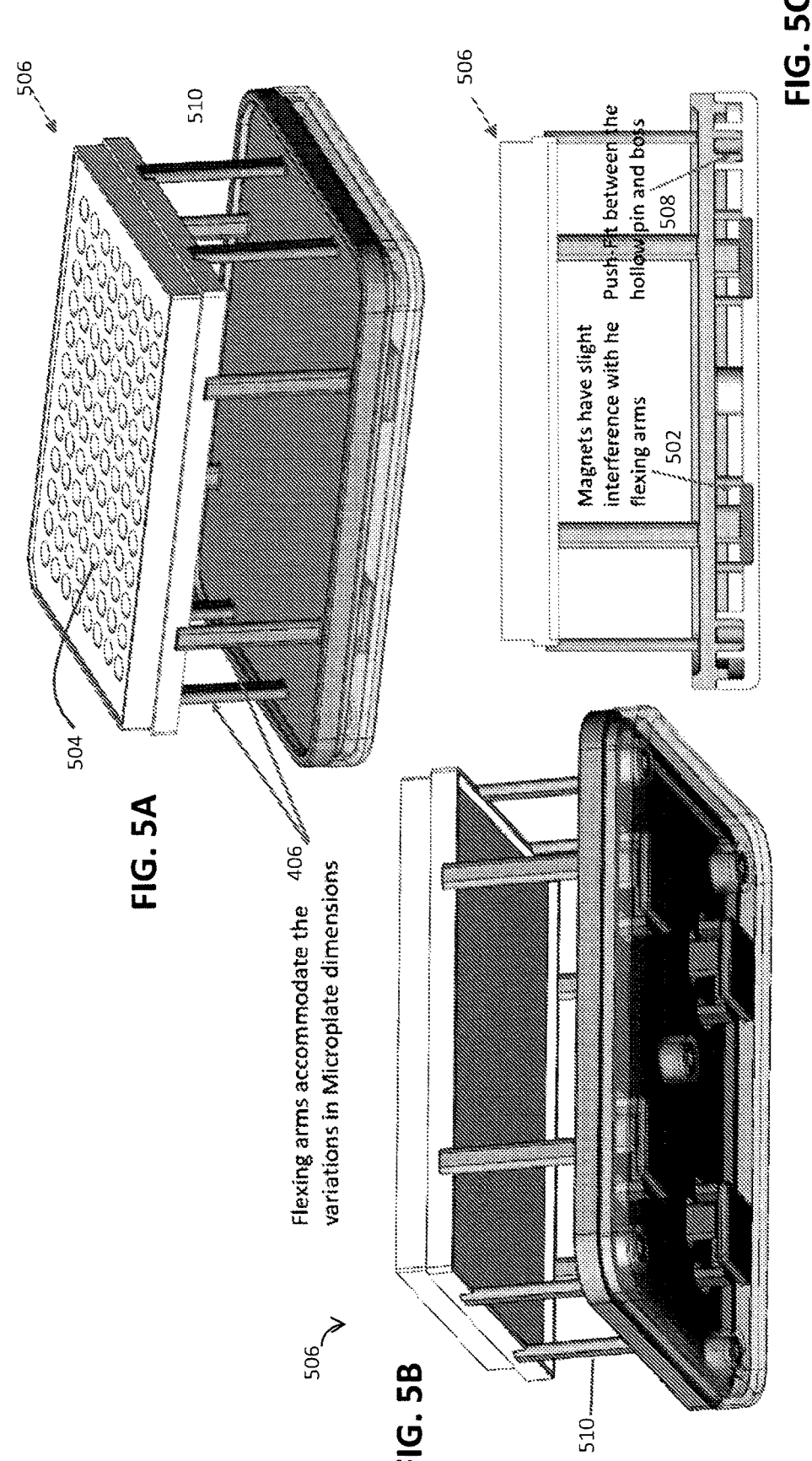
FIGS. 5A-5C are views of another embodiment of a follower carriage that has a different design than the follower carriage of FIG. 4.

FIGS. 5A-5C illustrate a follower carriage 506 that has a different design than the follower carriage 156 of FIG. 4. The follower carriage 506 includes, without limitation, a microplate 504, one or more bosses 508, and one or more upper flexing arms 510 (aka, cantilever arms) to receive a microplate 504.

The follower carriage 506 may have two fabricated parts (adapter 406 and carriage sleeve 408) and may require no assembly tools or assembly hardware. The follower carriage 506 is assembled with a light interference fit between hollow pins 507 and boss features 508. The microplate 504 nests into upper flexing arms 510 of the adapter 406. The upper flexing arms 510 locate the microplate 504 closer to a sorter stream for easier targeting of the wells of the microplate 504. The flexing arms 510 can flex to accommodate variations in dimensions of the microplate 506. The magnets 202 have slight interference with lower flexing arms 502 of the adapter 406 shown in FIGS. 5B-5C. The hollow pins 507 of the adapter 406 can be push-fit into the bosses 508 of the carriage sleeve 408, typically without the use of tools or other fasteners.

Figures 6A, 6B:
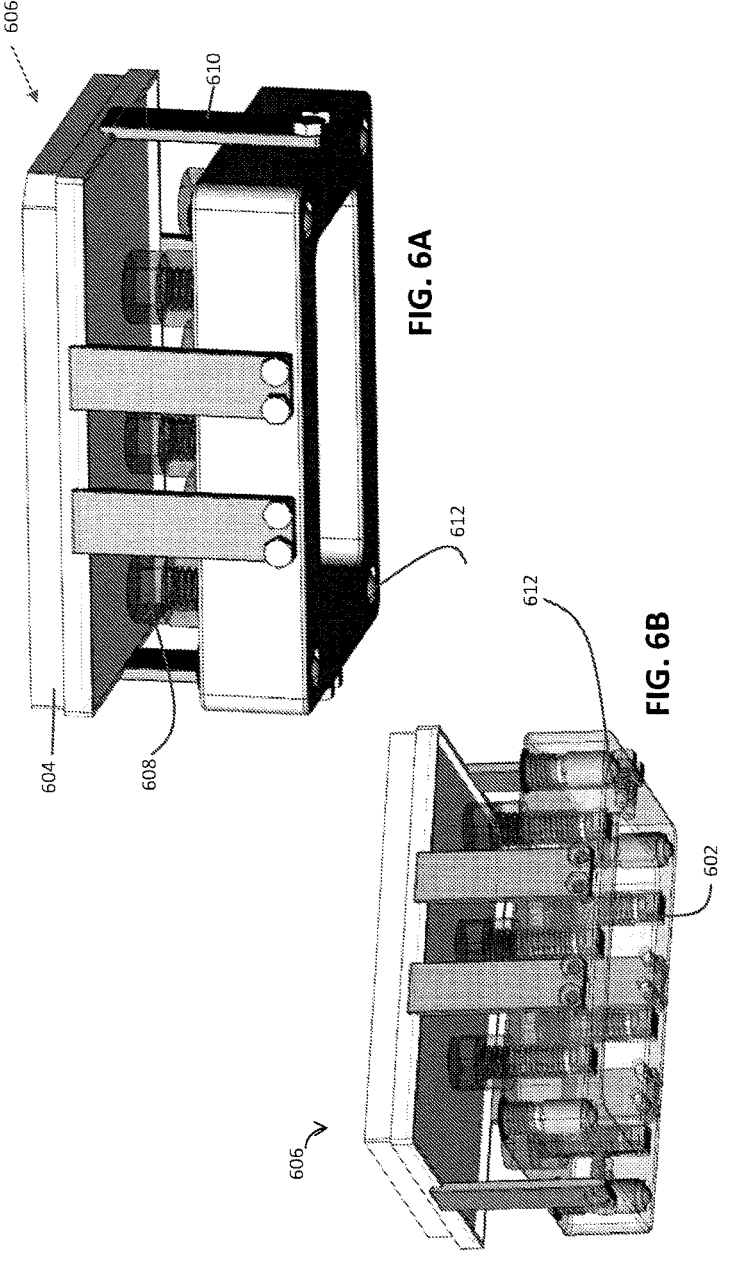
FIG. 6A-6B are perspective views of a follower carriage having a low friction design.

FIGS. 6A-6B illustrate a follower carriage 606 having a low friction design. The follower carriage 606 includes, without limitation, magnets 602, a microplate 604, one or more plastic screws 608, one or more flexing arms 610, and ball bearings 612.

Reducing the coefficient of friction (COF) can help reduce lag. The rolling ball bearings 612 reduces the COF. The ball bearings 612 are coupled to a bottom side of the base 609 of the follower carriage 606. The ball bearings 612 are configured to roll on a top surface of the separation plate 166, thereby reducing the COF between the follower carriage 606 and the separation plate 166. A ball bearing 612 can made of a chemically inert material (e.g., PEEK or other material). The rolling ball bearings may add to the complexity of the design of the follower carriage 606 in addition to making the follower carriage 606 more difficult to wash/disinfect. Nevertheless, the reduced friction is highly desirable.

In the example embodiment of FIGS. 6A-6B, six cube magnets 602 are held in place by using plastic screws 608. Flexing arms 610 are mounted on sides of the base 609 of the follower carriage 606 by fasteners (screws or bolts) 613. As shown in FIG. 6A, each of the flexible arms 610 includes a top notch 611. With the top notch 611, the plurality of flexible arms 610 form a nest on which the microplate 604 can be mounted.

Figures 7A, 7B, 8A, 8B:
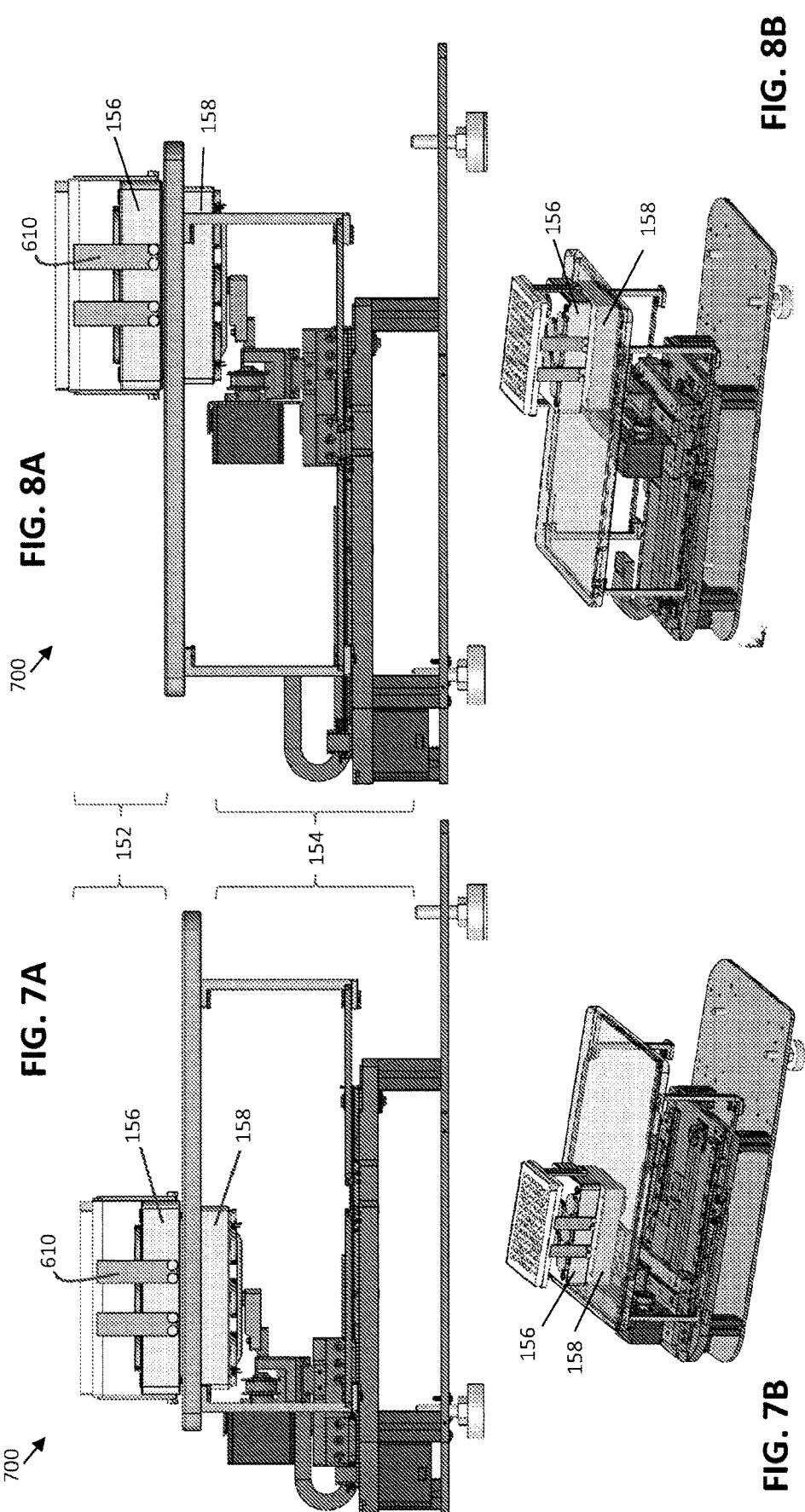
FIG. 7A-7B are respectively a side view and a perspective view of a collecting system with a magnetically coupled sample mover in one position.
FIGS. 8A-8B are respectively a side view and a perspective view of the collecting system with the magnetically coupled sample mover in another position.

FIGS. 7A-7B are respectively a sideview and a perspective view of a collecting system 700 with a magnetically coupled sample mover. The collecting system 700 shown in FIGS. 7A-7B is an alternative design to the collecting system 100 shown in FIG. 1B. The system 700 includes, without limitation, the following components: the top chamber 152, the bottom chamber 154, the follower carriage 606 (aka, driven tray) shown in FIGS. 6A-6B, the driver carriage 158 (aka, driving tray), the positioning stage 160 (aka, driver stage or driving stage), the microplate 162, the X-Y move mechanism 164, and two or more flex arms 610. As shown in FIGS. 7A-7B, the collecting system 700 has the follower carriage 156 and the driver carriage 158 moved to a leftward position.

FIGS. 8A-8B are respectively is another sideview and another perspective view of the collecting system 700 with a magnetically coupled sample mover with the follower carriage 606 in a different position. As shown in FIGS. 8A-8B, the collecting system 700 has the follower carriage 156 and the driver carriage 158 moved to a rightward position.

Components for Addressing Lag

Figure 9:
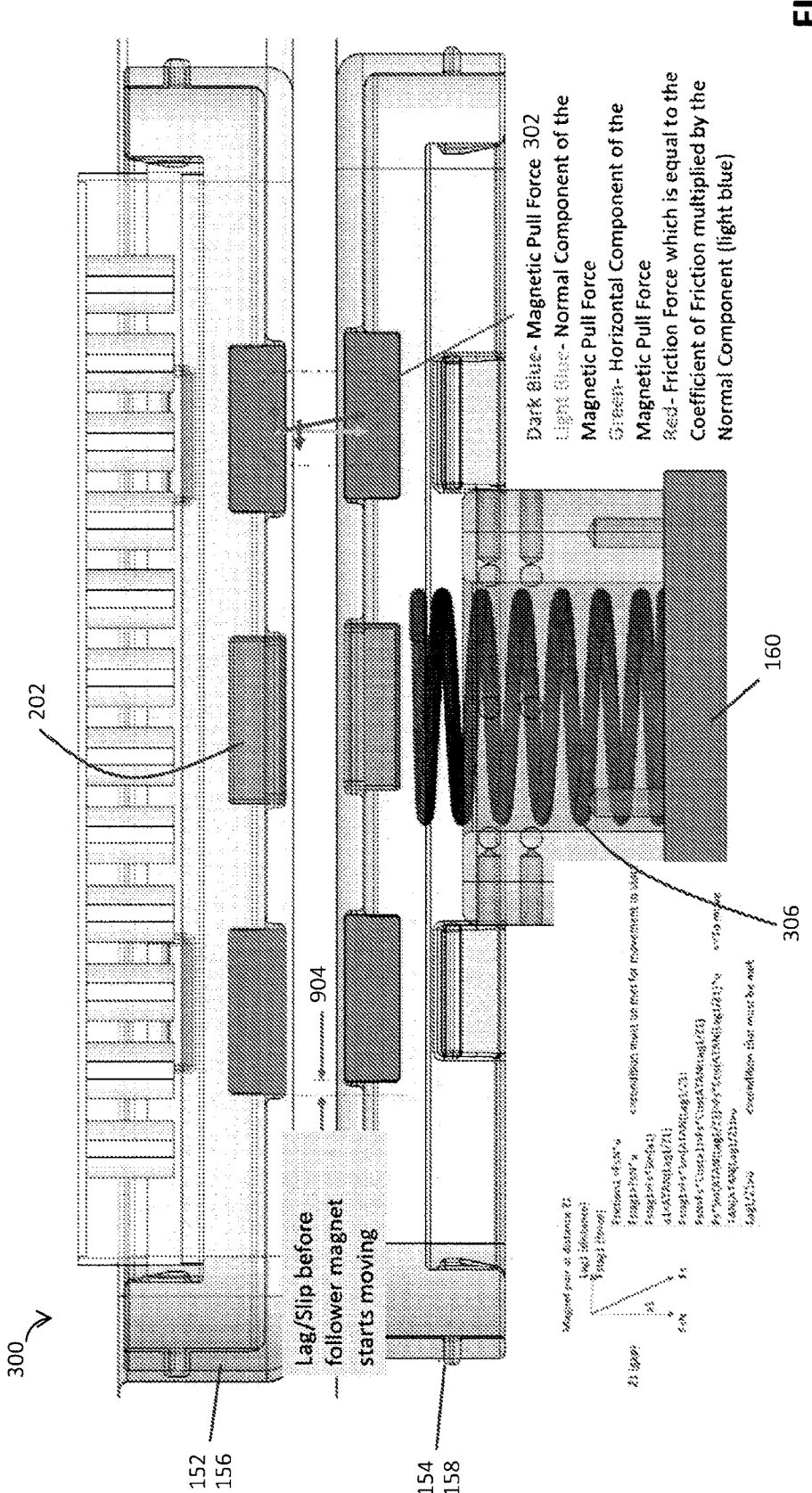
FIG. 9 is a cross-sectional view of the magnetically coupled mover while undergoing lag (aka, slip).

FIG. 9 is a cross-sectional view of the magnetically coupled mover 300 while undergoing lag 904 (aka, slip).

The lag 904 is a separation distance that begins to be present after the driver magnets 302 begin to move. The lag 904 may continue to be present while driver magnets 302 are in the process of moving and pulling the follower magnets 202. The lag 904 varies depending on the acceleration and/or velocity of the driver magnets 302. A magnet force ($F_s$) occurs between attracting magnet pairs. At least one magnet pair between the driver carriage 158 and the follower carriage 156 experiences an attraction force. The attraction force tends to cause (e.g., coerces) the follower carriage 156 to move in the movement direction of the driver carriage 158 when the driver carriage 158 moves. The acceleration and/or velocity of a driver magnet 302 determines a normal component ($F_{sN}$) and a horizontal component ($F_{slag1}$) of the magnetic force ($F_s$).

The magnetic pull force ($F_s$) can be broken down into the normal component ($F_{sN}$) and the horizontal component ($F_{slag1}$). A friction force ($Friction_1$) is equal to a coefficient of friction multiplied by the normal component ($F_{sN}$). Each pair of attracting magnets is separated by a distance $Z_1$. The lag 904 has a separation distance $Lag_1$. The force components and lag 904 can be described and determined by using the following equations in Equation Set 1:

$$Friction1 = FsN * u \qquad \text{Equations set 1}$$

$$Fslag1 >$$

$$FsN * u <= \text{condition mus be met for movement to start}$$

$$Fslag1 = Fs * \text{Sin}(a1)$$

$$a1 = \text{ATAN}(Lag1/Z1)$$

$$Fslag1 = Fs * \text{Sin}(\text{ATAN}(Lag1/Z1))$$

$$FsN = Fs * \text{Cos}(a1) = Fs * \text{Cos}(\text{ATAN}(Lag1/Z1))$$

$$Fs * \text{Sin}(\text{ATAN}(Lag1/Z1)) >$$

$$Fs * \text{Cos}(\text{ATAN}(Lag1/Z1)) * u <= \text{To move}$$

$$\text{TAN}(\text{ATAN}(Lag1/Z1)) > u$$

$$Lag1/Z1 > u <= \text{condition that must be met.}$$

Figures 10A, 10B:
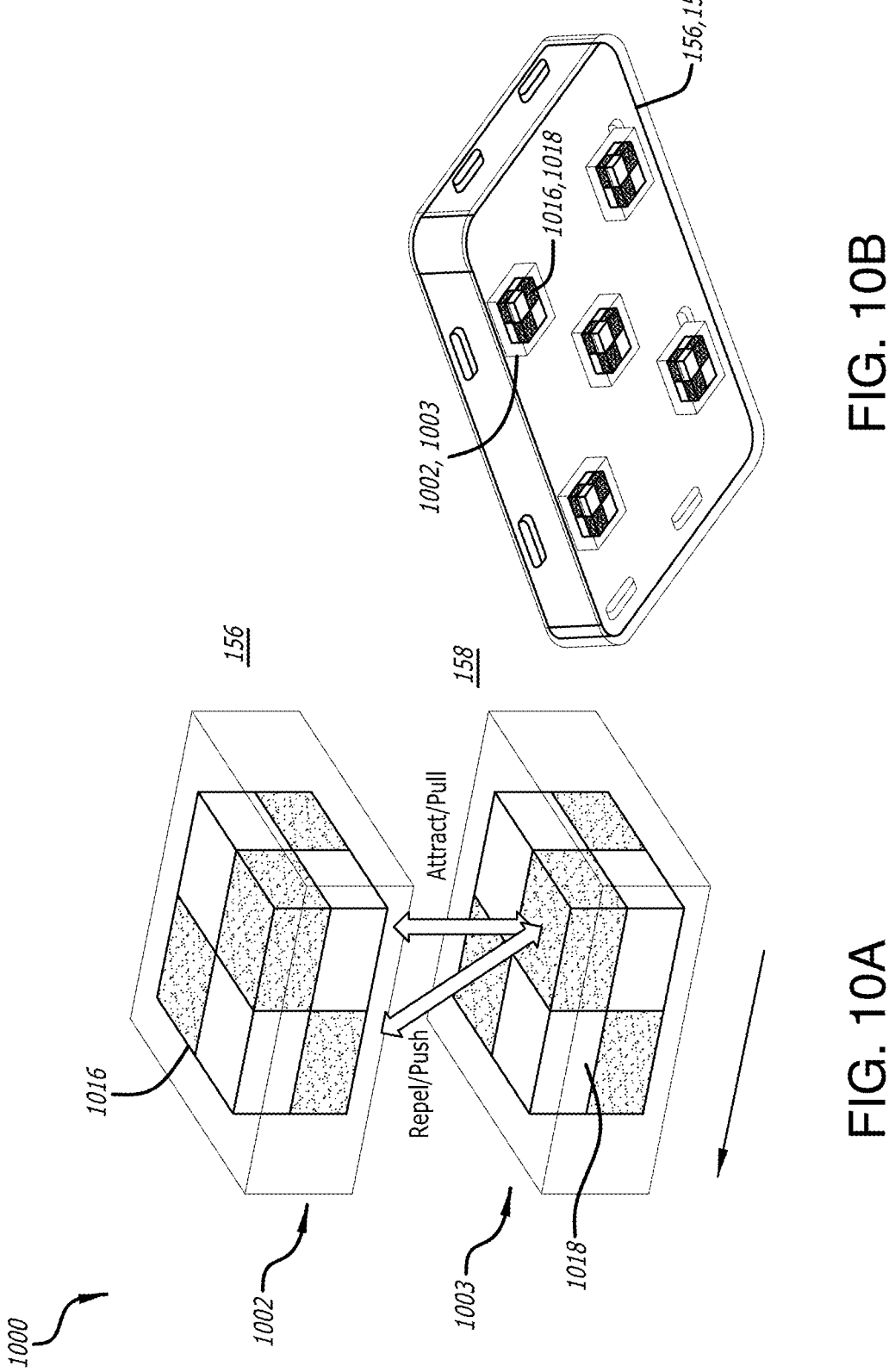
FIG. 10A is a conceptual diagram of a push/pull magnet arrangement for the magnetically coupled mover.
FIG. 10B is a diagram of the push/pull magnet arrangement of FIG. 10A in a follower carriage.

FIG. 10A is a conceptual diagram of a push/pull magnet arrangement 1000. The magnet arrangement 1000 includes without limitation follower magnet arrangement 1016, driver magnet arrangement 1018, a frame 1002 for the follower carriage 156, and a frame 1003 for the driver carriage 158. The frame 1002 and the frame 1003 are optional. FIG. 10B shows a carriage 156 or 158 having magnet clusters 1016 or 1018 of a magnet arrangement 1000.

One of the ways to reduce lag 904 is to take advantage of a combination of (1) magnet polarities that attract each other and (2) magnet polarities that repel each other. Magnet polarities that attract each other in a current position of the carriages (156, 158) have a pull force when the driver carriage starts to move. Carriage movement in a horizontal direction (e.g., X or Y direction) takes advantage of pulling directly paired magnets that have opposite polarities. Meanwhile, magnet polarities that repel each other have repelling forces due to same-polarity magnets. Repelling forces get stronger as magnetic fields of same-polarity magnets get closer. Repelling forces contribute to motion of the driver carriage 158 by pushing away magnets having same polarities in the follower carriage 156. Repelling forces also reduce a normal force and, thus, an effective friction force.

A driver magnet arrangement 1018 includes the driver magnets arranged such that alternating polarities are facing the follower carriage 156. A follower magnet arrangement 1016 includes the follower magnets arranged such that alternating polarities are facing the driver carriage 158. One or more magnet pairs have magnets of opposite polarities facing each other. One or more magnet pairs have magnets of same polarities facing each other For this technique to work, the magnet arrangement 1000 includes relatively more magnets than an arrangement having all pulling magnet pairs. The magnets should be sufficiently spread out to enable attracting forces and repelling forces to have adequate strength to perform properly. In one embodiment of the arrangement 1000, attracting magnets and repelling magnets are clustered together, as shown in FIG. 10A. In another embodiment, attracting magnet pairs are in one location, while repelling magnet pairs are in another location.

Figure 11:
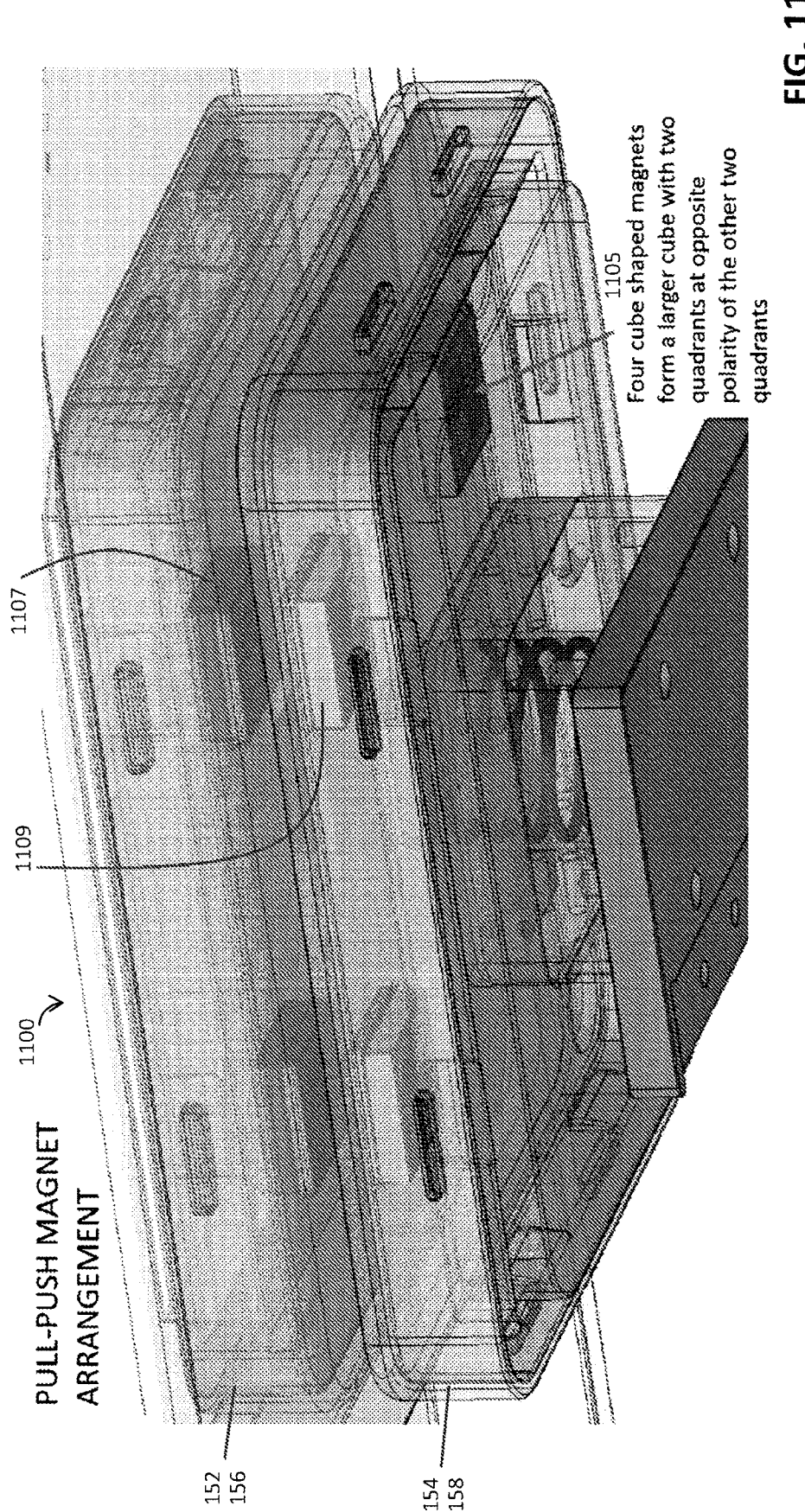
FIG. 11 is a conceptual diagram of the magnetically coupled mover with the push-pull magnet arrangement of FIGS. 10A and 10B.

FIG. 11 is another conceptual diagram of a push-pull magnet arrangement 1100. In the driver carriage 158, four cube-shaped magnets form a larger cube 1105 with two quadrants of opposite polarity of the other two quadrants. In the follower carriage 156, a magnet 1107 may have the same polarity of half the magnets in a corresponding magnet cube 1109 in the driver carriage. The magnet 1107 may also have the opposite polarity of half the magnets in the corresponding magnet cube 1109 in the driver carriage. As discussed with reference to FIG. 10, same polarities repel. Opposite polarities attract.

Figures 12A, 12B:
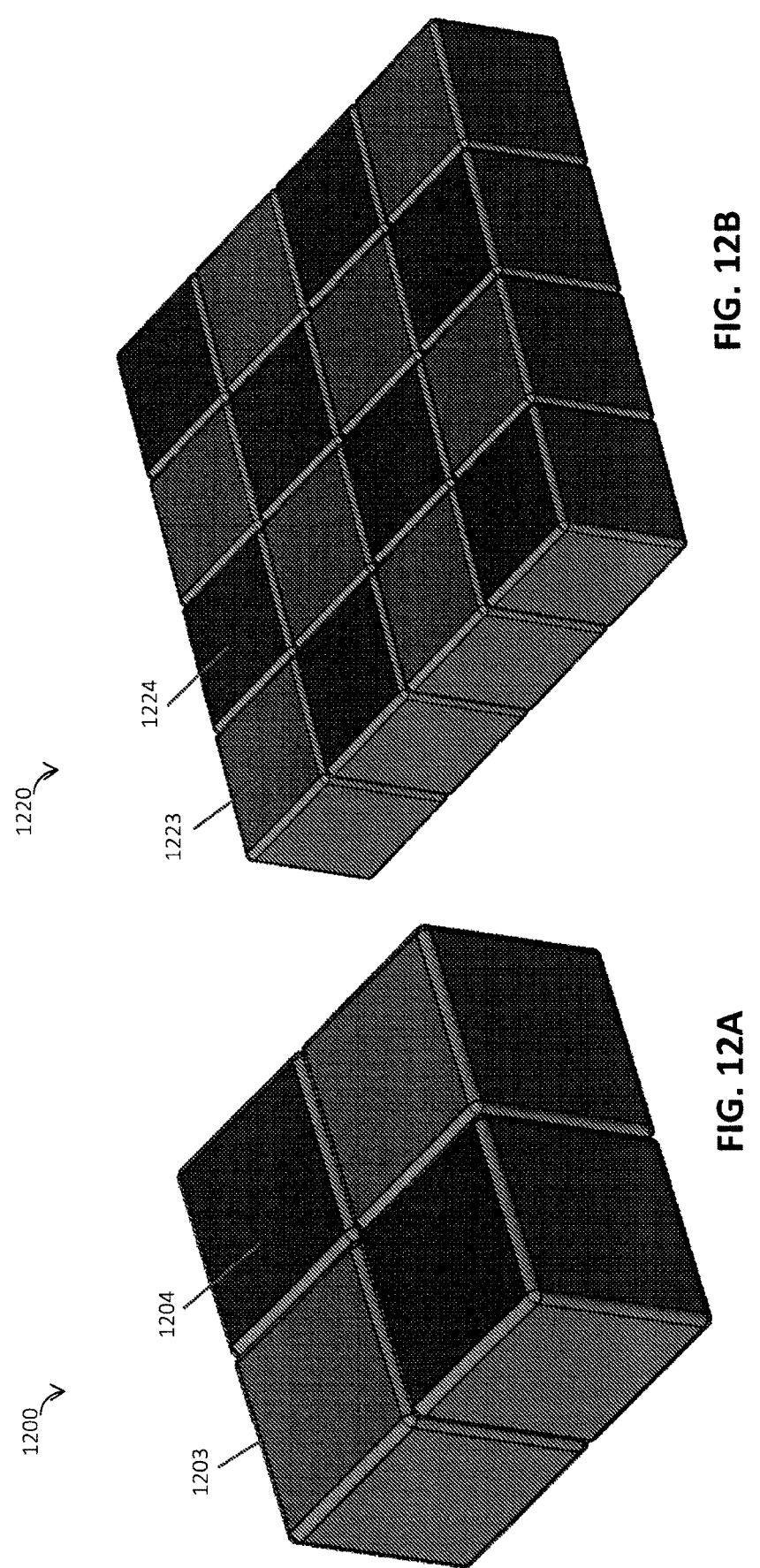
FIGS. 12A-12B are conceptual diagrams of two different magnet arrangements for the magnetically coupled mover.

FIGS. 12A-12B are conceptual diagrams of two different magnet arrangements 1200,1220 for the magnetic mover. In FIG. 12A, the magnet arrangement 1200 has four cube-shaped magnets that forms four quadrants with two quadrants of opposite polarity of the other two quadrants. The magnet arrangement 1200 includes two diagonal magnets having one polarity 1203 and two diagonal magnets having an opposite polarity 1204. In FIG. 12B, another magnet arrangement 1220 has sixteen cube-shaped magnets. The arrangement 1220 can be formed out of four instances of the magnet arrangement 1200. Eight cube-shaped magnets (four diagonal pairs of cube shaped magnets) of the sixteen have one polarity 1223 and eight other cube-shaped magnets (four diagonal pairs of cube shaped magnets) have an opposite polarity 1224. A magnet arrangement for a push-pull architecture can have any shape and any combination of polarities.

Figures 13A, 13B, 13C:
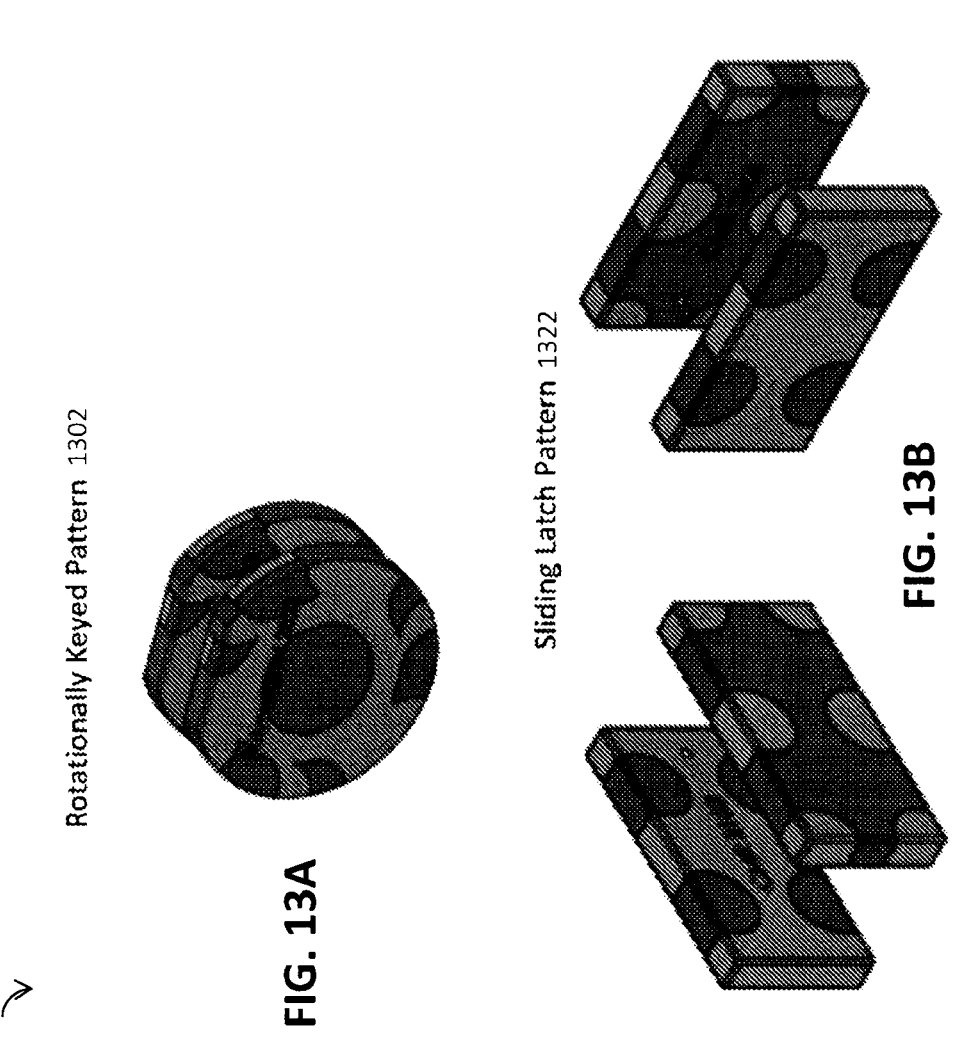
FIGS. 13A-13C are conceptual diagrams of three other example magnet arrangements for the magnetically coupled mover.

FIGS. 13A-13C are conceptual diagram of further magnet arrangements 1300A-1300C for the magnetic mover. The magnet arrangements 1300A-1300C include, without limitation, a rotationally keyed magnetic pattern 1302, a two-dimensional alignment magnetic pattern 1312, and a sliding latch magnetic pattern 1322.

A magnet arrangement 1300A-1300C for a push-pull architecture can have any shape and any combination of polarities. A given magnet arrangement 1300A-1300C can have any percentage (0%-100%) of opposite-polarity magnet pairs and any corresponding percentage (100%-0%) of same-polarity magnet pairs. Specifically, a given magnet arrangement can have any ratio of opposite-polarity magnet pairs to same-polarity magnet pairs (e.g., opposite-polarity/same-polarity). For example, if 60% of magnet pairs have the same polarity, then 40% of magnet pairs will have opposite polarities. If 50% percent of magnet pairs have the same polarity, then 50% of magnet pairs will have opposite polarities. If 30% percent of magnet pairs have the same polarity, then 70% of magnet pairs will have opposite polarities, and so on.

A magnet arrangement 1300A-1300C can have any mixture of quality and/or strength of magnets. For example, the same-polarity magnet pairs may be designed to be weaker than the opposite-polarity magnet pairs. In such an arrangement, the repelling force from the same-polarity magnet pairs may be weaker than the attraction force of the opposite-polarity magnet pairs, depending on the ratio of opposite-polarity/same-polarity in the magnet arrangement. Alternatively, the same-polarity magnet pairs may be designed to be stronger than the opposite-polarity magnet pairs. In such an arrangement, the repelling force from the same-polarity magnet pairs may be stronger than the attraction force of the opposite-polarity magnet pairs, depending on the ratio of opposite-polarity/same-polarity.

A magnet arrangement 1300A-1300C can have varying distances of separation between magnet pairs. For example, same-polarity magnet pairs may be designed to be 10.0 mm apart, while the opposite-polarity magnet pairs may be designed to be 8.0 mm apart. In such a situation, the repelling force from the same-polarity magnet pairs may be weaker than the attraction force of the opposite-polarity magnet pairs, depending on the ratio of opposite-polarity/same-polarity in the magnet arrangement. In another example, same-polarity magnet pairs may be designed to be 6.5 mm apart, while the opposite-polarity magnet pairs may be designed to be 9.0 mm apart. In such a situation, the repelling force from the same-polarity magnet pairs may be stronger than the attraction force of the opposite-polarity magnet pairs, depending on the ratio of opposite-polarity/same-polarity in the magnet arrangement.

Figures 14A, 14B, 14C:
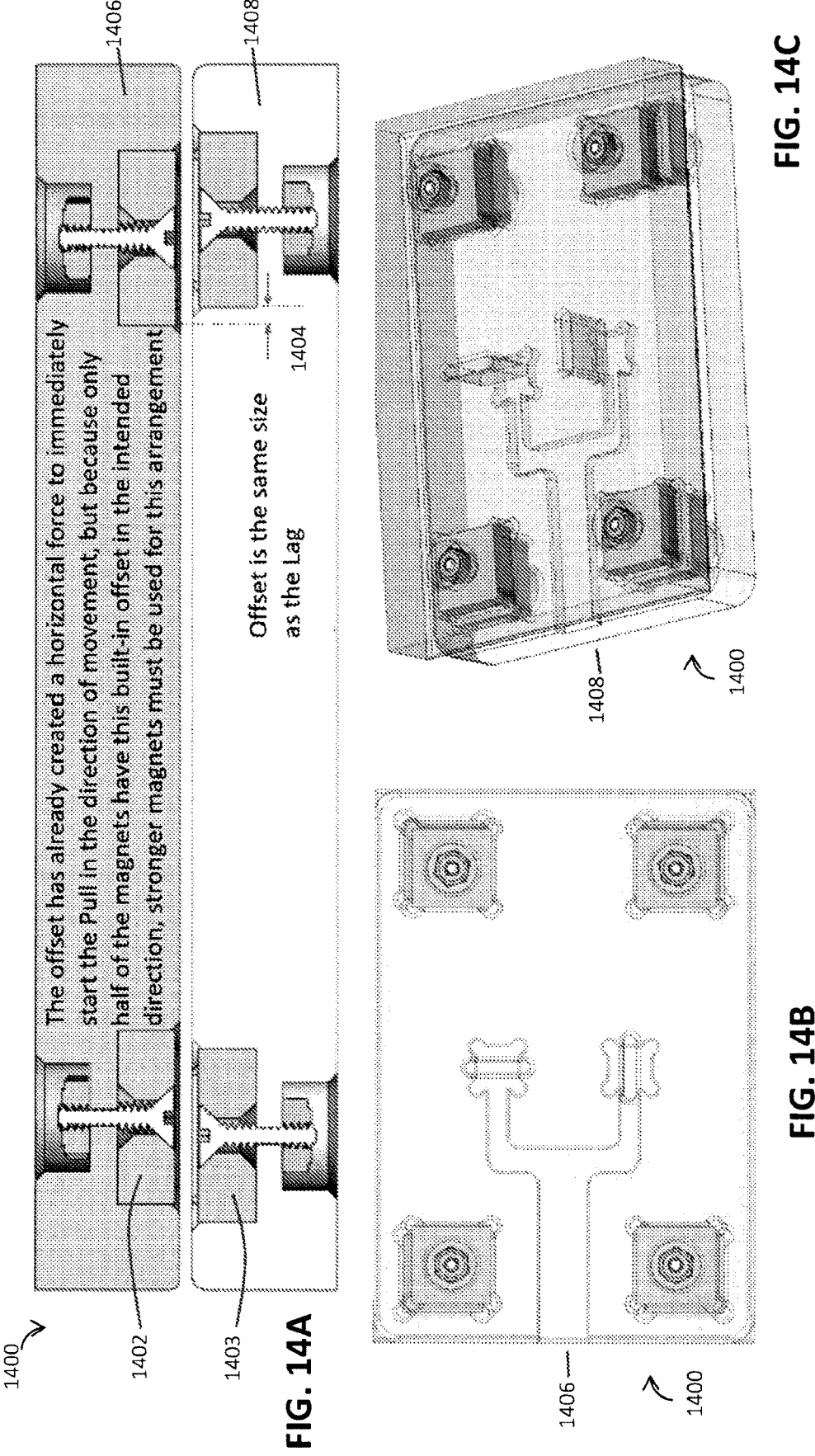
FIGS. 14A-14C are conceptual diagrams of a magnetically coupled mover to reduce lag.

FIGS. 14A-14C are conceptual diagrams of a magnetically coupled mover 1400 to reduce lag. The magnetically coupled mover 1400 includes, without limitation, a follower carriage 1406 and a driver carriage 1408. The follower carriage 1406 includes a plurality of follower magnets 1402. The driver carriage 1408 includes a plurality of driver magnets 1403. The plurality of follower magnets and the plurality of driver magnets are mounted by fasteners to the follower carriage 1406 and the driver carriage 1408 respectively such that one or more pairs of magnets are offset by a magnet pair mounting offset 1404.

A magnet pair, including a follower magnet 1402 and an opposing driver magnet 1403, can be mounted to have the offset 1404. Before the driver carriage 1408 moves, the offset 1404 is configured to account for a horizontal force that pulls the follower carriage 1406 in the direction of movement. However, not all the magnets may have a built-in offset 1404 in the intended direction. Accordingly, it may be desirable to use stronger magnets where there is a built-in offset 1404 between magnet pairs.

Components for Addressing Surface Imperfections and Friction

Figure 15:
FIG. 15 is a perspective view of a collecting system with a magnetically coupled sample mover.

FIG. 15 is a perspective view of a collecting system 1500 with a magnetically coupled sample mover. The system 1500 includes, without limitation, the following components: the top chamber 152, the bottom chamber 154, the follower carriage 156 (aka, driven tray), the driver carriage 158 (aka, driving tray), the separation plate 166, the compression spring 306, and cantilever springs 1502.

One or more cantilever springs are mounted onto the bottom chamber 154. The separation plate 166 is mounted onto the cantilever springs. The compression spring 306 applies an upward force on the driver carriage 158 and helps ensures contact with the separation 304 despite potential non-coplanarities in the system 1500. The cantilever springs 1502 provide flexible mounting for the separation plate 166. In one embodiment, four cantilever springs 1502 are mounted onto an underside of the separation plate 166. A cantilever spring 1502 is mounted onto, or near, each corner of the underside of the separation plate 166.

Figure 16:
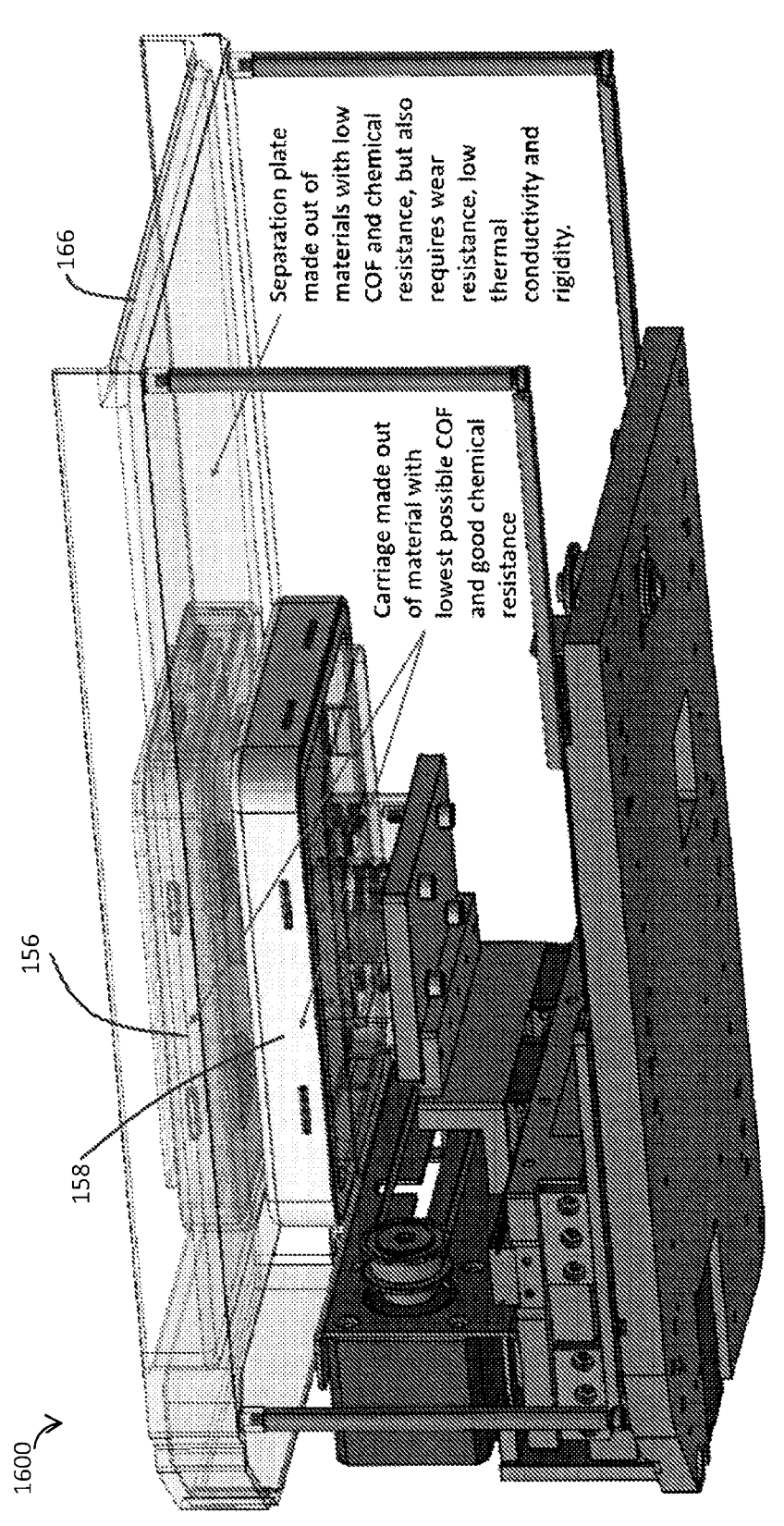
FIG. 16 is another perspective view of the collecting system with a magnetically coupled sample mover.

FIG. 16 is another perspective view of the collecting system 1500 with a magnetically coupled sample mover. It is desirable for sliding surfaces to have low to zero stiction. Stiction is friction that tends to prevent surfaces from being set in motion. The sliding surfaces include, for example, the separation pate 304 and surfaces sliding along the separation plate 166. Accordingly, an important consideration for low to zero stiction movement is a selection of materials for sliding materials, including the follower carriage 156, the driver carriage 158, and the separation plate 166.

Sliding surfaces of each carriage (156, 158) should be made of material with a lowest available COF (coefficient of friction) or lowest possible COF. The sliding surface should also have a high chemical resistance. Example suitable materials for the carriages (156, 158) include, without limitation, PTFE (polytetrafluoroethylene), PCTFE (poly-chlorotrifluoroethylene), UHMWPE (ultra-high-molecular-weight polyethylene), and/or PP (polypropylene).

Sliding surfaces of the separation plate 166 should also be made of materials with low/lowest COF and low chemical resistance. The sliding surface material also should have high wear resistance, low thermal conductivity, and high rigidity. Example suitable materials for the separation plate 166 include, without limitation, PEEK (polyether ether ketone), PPSU (polyphenylsulfone), and/or PCTFE (poly-chlorotrifluoroethylene). The materials for the separation plate 166 can benefit from a coating including DLC (diamond-like carbon) to improve wear resistance and reduce the COF (coefficient of friction). Various acetal grades may also be considered for the separation plate 166 and/or carriages (156, 158).

Figures 22A, 22B:
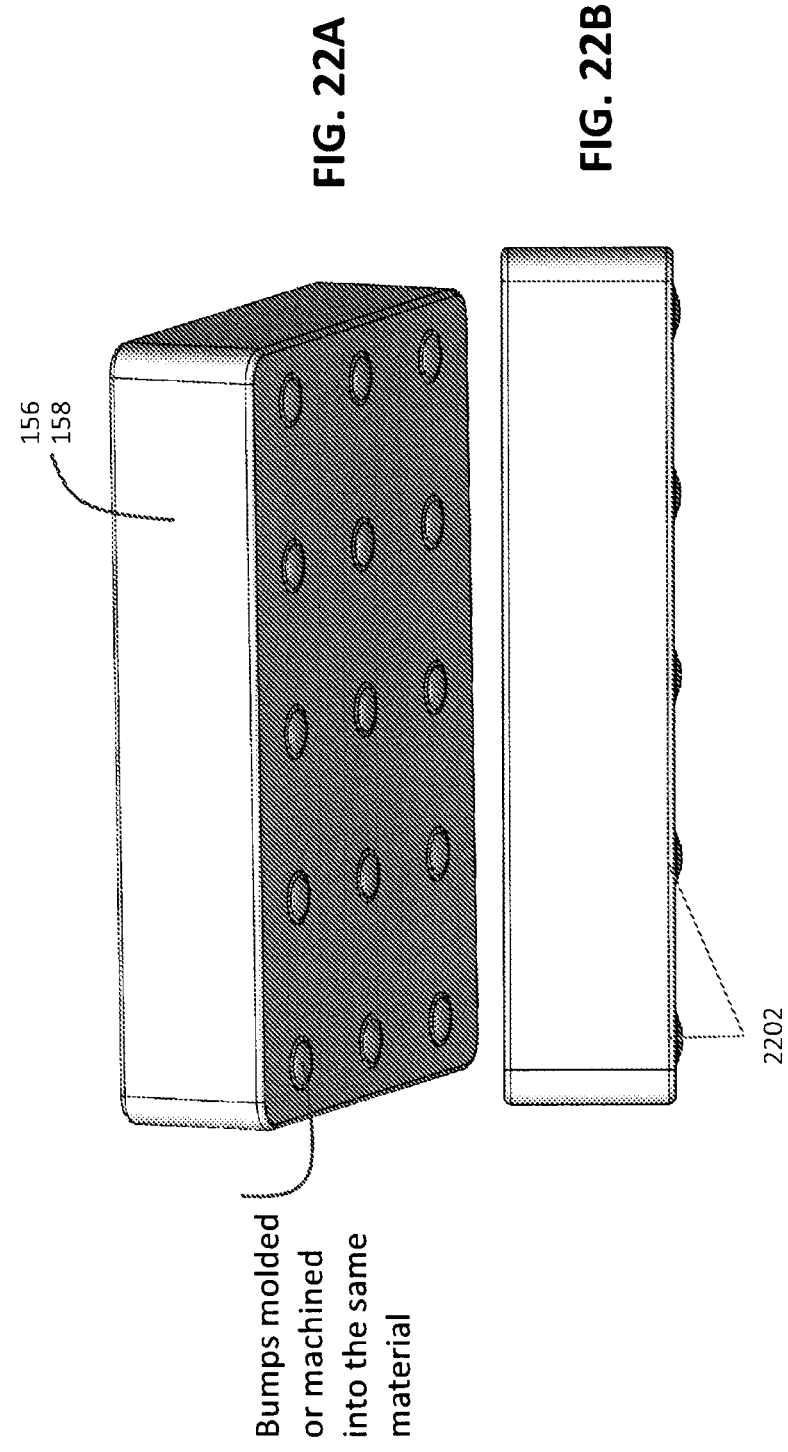
FIG. 22A-22B are conceptual diagrams of sliding bump geometry on a carriage.

FIGS. 22A-22B are a conceptual diagram of sliding bump geometry 2200 on a carriage (156, 158). A carriage (156, 158) may include multiple bumps 2202 (e.g., protrusion geometries) that can act as a contacting surface geometry. Advantageously, bumps 2202 can reduce the coefficient of friction (COF) between sliding surfaces and isolate sliding wear to primarily the bumps 2202. The bumps 2202 are molded or machined into the same material as the main body of the carriage (e.g., follower carriage 156 and/or driver carriage 158).

Figure 23:
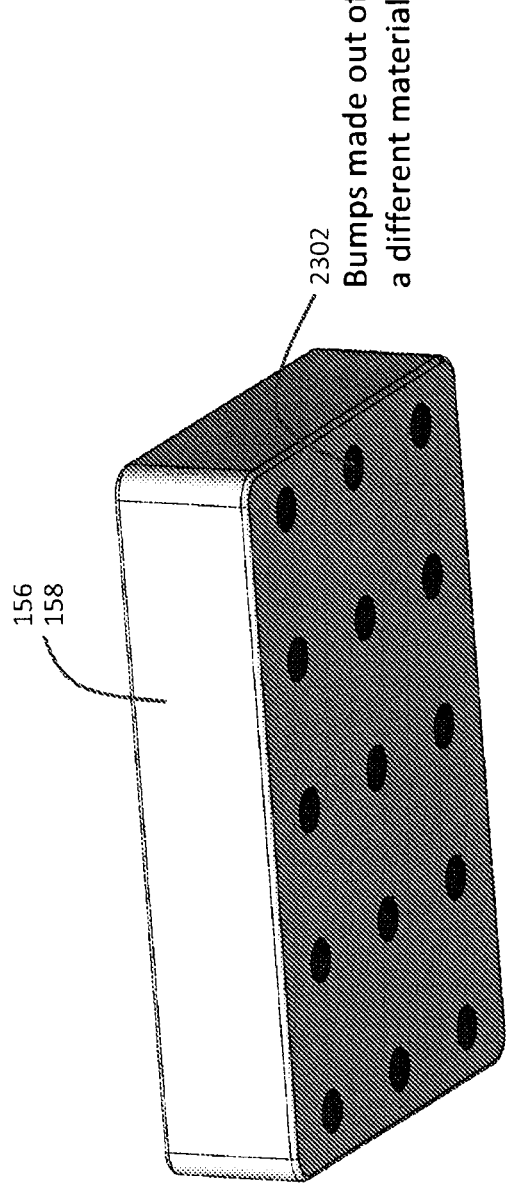
FIG. 23 is conceptual diagram of another embodiment of a sliding bump geometry on a carriage.
Figures 24A, 24B, 24C, 24D, 24E, 24F:
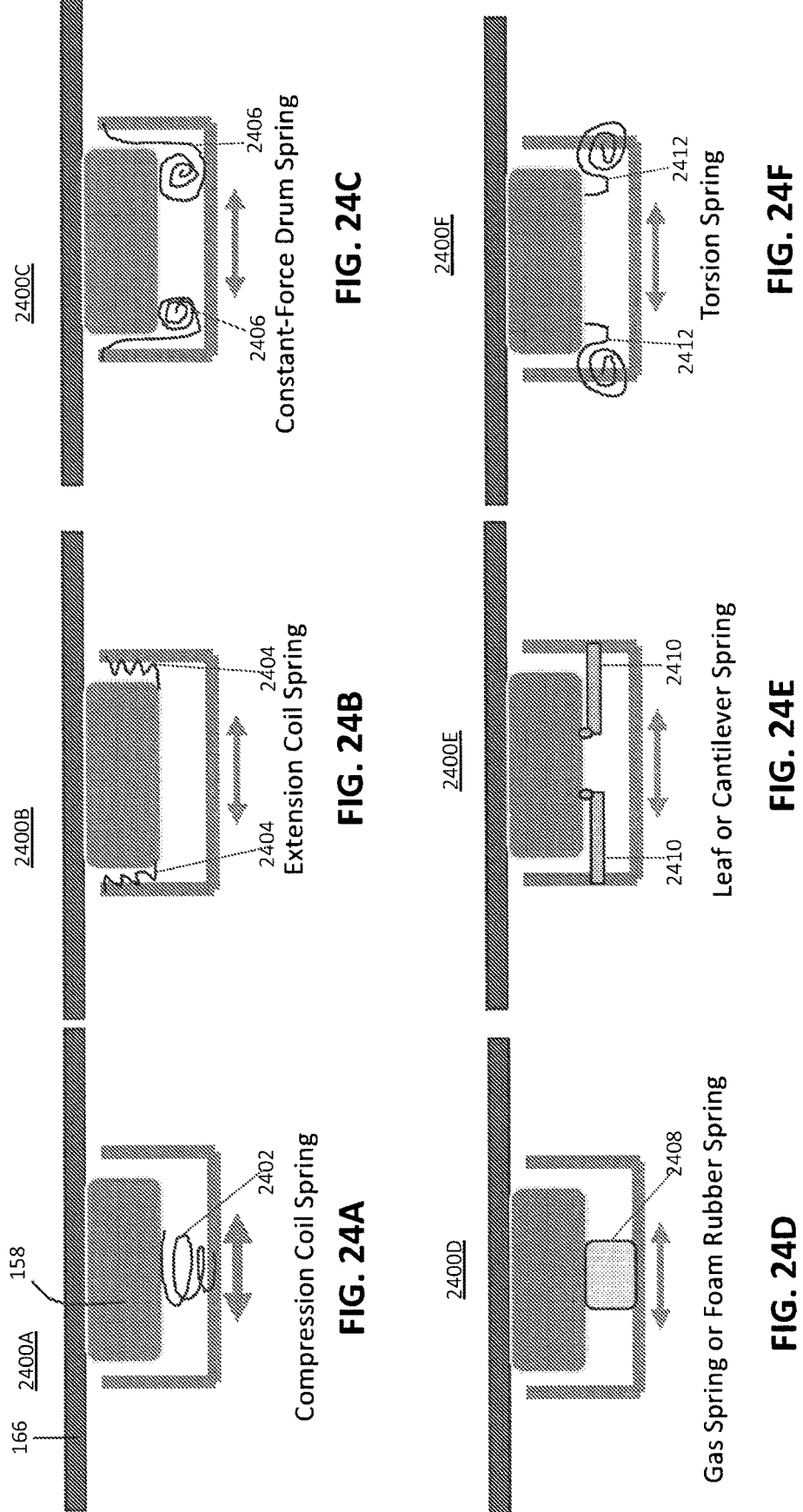
FIG. 24A-24F are a conceptual diagrams of various spring collecting systems for the driver carriage.

FIG. 23 is conceptual diagram of sliding bump geometry 2300 on a carriage (156, 158). A carriage (156, 158) may include multiple bumps 2302 (e.g., protrusion geometries) that can act as a contacting surface geometry. Advantageously, bumps 2302 can reduce the COF (coefficient of friction) between sliding surfaces and isolate sliding wear to primarily the bumps 2002. The bumps 2302 are made of a different material than the main body of the carriage (156, 158). The bumps 2302 can be made of a material that is more expensive than the main body of the carriage (156, 158). The more expensive bumps 2302 can have more desirable properties than the main body of the carriage (156, 158). The bumps 2302 can be inserted into the bulk of the main body of the carriage (156, 158). Accordingly, the main body of the carriage (156, 158) can be made of a material that is less expensive than the material of the bumps 2302.

FIGS. 24A-24F are conceptual diagrams of various spring loading systems 2400A-2400F for the driver carriage 158. Example spring loading systems 2400A-2400F may include, without limitation, a compression coil spring 2402, an extension coil spring 2404, a constant-force drum spring 2406, a gas or foam rubber spring 2408, a leaf or cantilever spring 2410, and/or a torsion spring 2412. A spring loading system 2400A-2400F spring loads the driver carriage 158 against the separation plate 166. The spring loading helps keep a distance between the driver magnets 302 and the follower magnets 202 as consistent as possible.

Feedback Systems for Detecting Position of Follower Carriage

The system 100 can provide standard rotary feedback (e.g., encoders of electric motors, servomotors) and standard linear position feedback (e.g., contact switches) for the positioning stage that drives the driver carriage 158. However, the follower carriage 156 is isolated from any such direct feedback system. To detect the horizontal position of the follower carriage 156 in a plane, the system 100 can implement one of several technologies. Detecting the position of the follower carriage 156 also verifies the position of the driver carriage 158.

The system 100 can include a linear position feedback system for the carriages (156, 158) for sensing distance and motion in horizontal X and Y directions. The sensors can include, for example, an X-direction sensor and a Y-direction sensor to detect the horizontal position, velocity, and acceleration of the follower carriage 156 in a plane. With distances and motion over time detected, distances can be differentiated over time to determine velocity and velocity further differentiated over time to determine acceleration of a moving follower carriage 156.

Figure 17:
FIG. 17 is a conceptual diagram of a linear position feedback system for the carriages.

FIG. 17 is a conceptual diagram of a linear optical position feedback system 1700 for the carriages (156, 158) The system 100 can implement an X-direction reflector photocoupler position sensor 1702 and a Y-direction reflector photocoupler position sensor 1704 for sensing motion in the horizontal X and Y directions. The X-direction and Y-direction sensors include a light source (e.g., an LED or a laser diode) and a light receiver (e.g., a photo-detector). The light source of the X-direction sensor 1702 generates a transmit light beam 1703T onto a spot 1703S on a side of the follower carriage 156 that is reflected back as a reflected light beam 1703R. The light receiver of the X-direction sensor 1702 receives the reflected light beam 1703R and can compare it against the transmit light beam 1703T to determine an X distance. Similarly, the light source of the Y-direction sensor 1704 generates a transmit light beam 1706T onto a spot 1706S on a perpendicular side of the follower carriage 156 that is reflected back as a reflected light beam 1706R. The light receiver of the Y-direction sensor 1704 receives the reflected light beam 1706R and can compare it against the transmit light beam 1706T to determine a Y distance. The X and Y distances can be differentiated over time to determine velocity and acceleration in the X and Y directions for a moving follower carriage 156.

Figure 18:
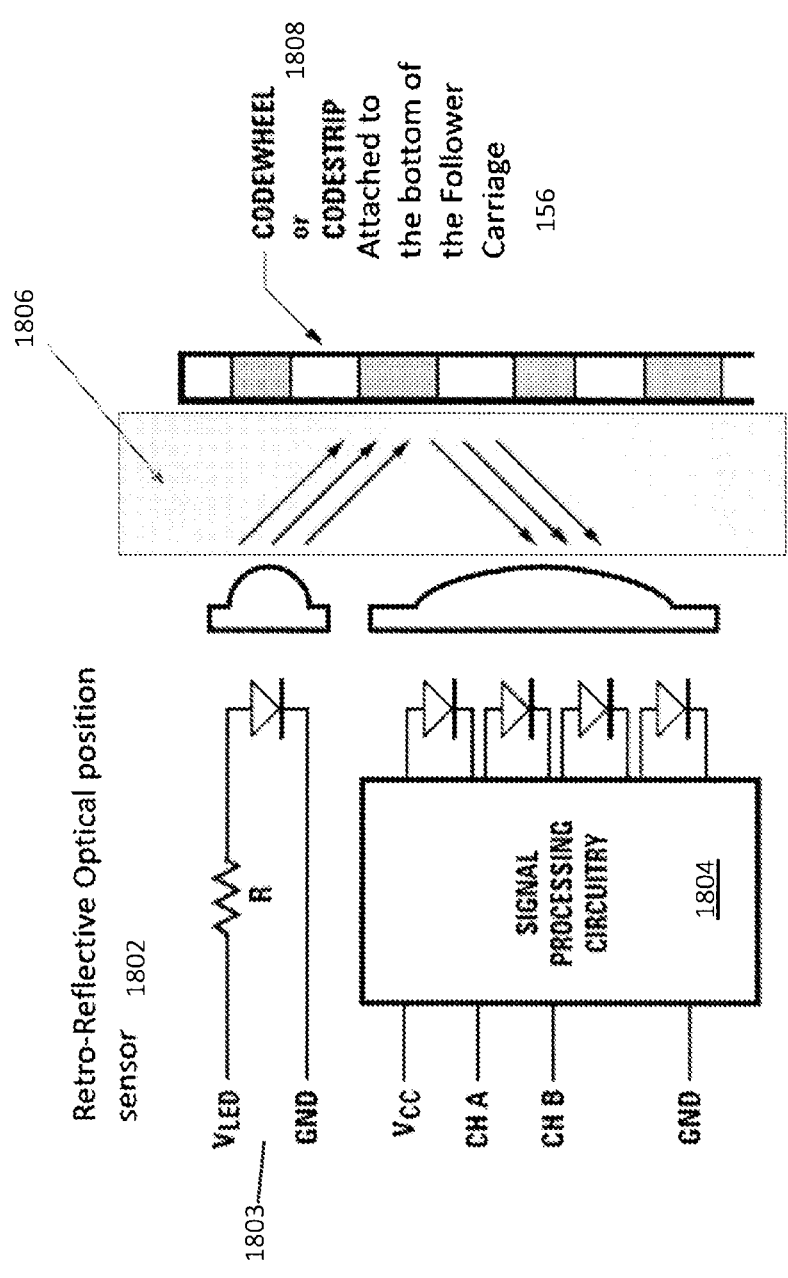
FIG. 18 is a conceptual diagram of a retro-reflective optical position feedback system for the carriages.

FIG. 18 is a conceptual diagram of a retro-reflective position feedback system 1800 for the carriages (156, 158). The feedback system 1800 includes, without limitation, a retro-reflective optical position sensor 1802, a transparent layer 1806, and a codewheel and/or a codestrip 1808. The position sensor 1802 includes, without limitation, a light-emitting diode 1803 and signal processing circuitry 1804. The transparent layer 1806 may include the separation plate 166.

The light-emitting diode 1803 projects light through the transparent layer and onto the codewheel and/or codestrip 1808. The codewheel and/or codestrip 1808 is attached to a bottom surface of the follower carriage 156. The codewheel and/or codestrip 1808 reflects light back to the signal processing circuit 1804. Based on the light reflected from the codewheel and/or codestrip 1808, the signal processing circuit 1804 can calculate the position, the velocity, and the acceleration of the follower carriage 156.

Figure 19A:
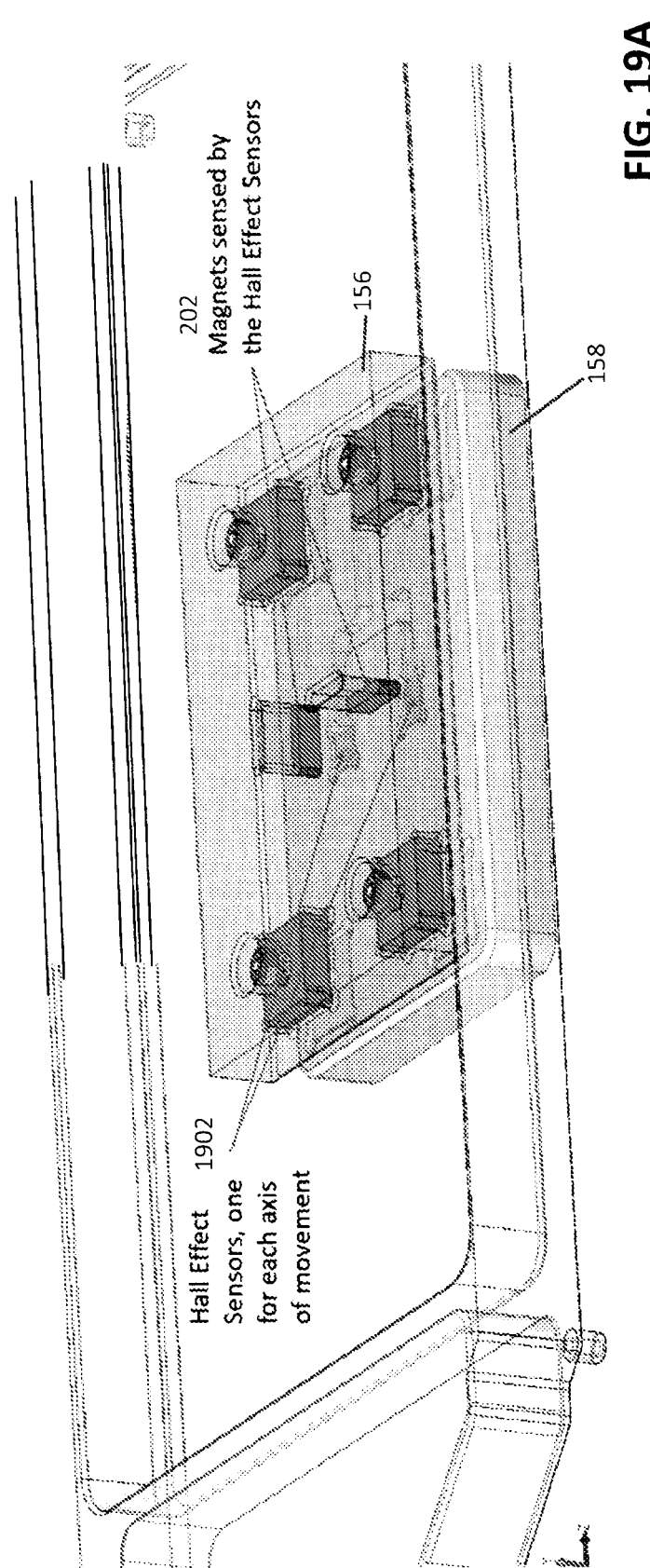
FIG. 19A is a conceptual diagram of a Hall effect position feedback system for the carriages.

FIG. 19A is a conceptual diagram of a Hall effect position feedback system 1900 for the carriages (156, 158), (1406, 1408). The feedback system 1900 includes, without limitation, Hall effect sensors 1902A-1902B and magnets 1912A-1912B. As is shown in FIG. 19A, the magnets 1912A-1912B are perpendicular to each other and respectively sensed by the Hall effect sensors. As is also shown in FIG. 14A, the upper carriage 1406 includes magnets 1402 and the lower carriage 1408 includes magnets 1403.

Figures 19B, 19C:
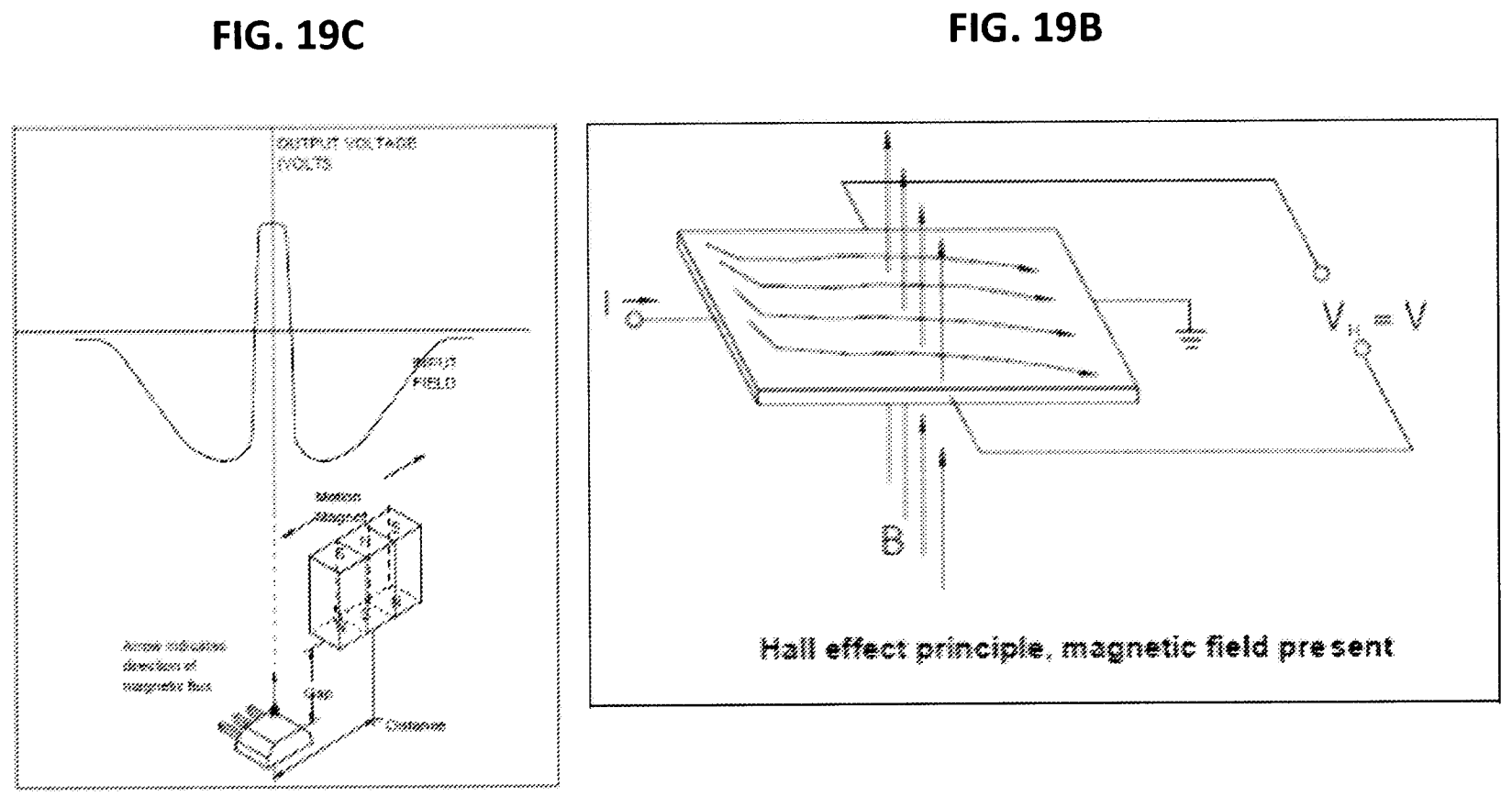

FIG. 19B is a diagram of the Hall effect when a magnetic field is present from a magnet. FIG. 19C is a chart of the magnetic flux sensed by a Hall effect sensor when a magnet that generates a magnetic field is moved across the Hall effect sensor. The Hall effect is the production of a voltage difference (e.g., the Hall voltage) across an electrical conductor, transverse to an electric current in the conductor and to an applied magnetic field perpendicular to the current.

The Hall effect sensors 1902 can be coupled to a carriage. The Hall effect sensors are typically coupled to the follower carriage 152 but can be coupled to the driver carriage 154 additionally or alternatively. The Hall effect sensors 1902 detect a position of the magnets 202 in the follower carriage 156. The Hall effect sensors 1902 include, without limitation, an X-axis Hall effect sensor and a y-axis Hall effect sensor. The Hall effect sensors 1902 detect and report relative movement between the driver carriage 158 and the follower carriage 156.

In addition to Hall effect sensors 1902 and optical sensors 1802, the feedback system can use other sensing technologies to detect the position and/or presence of the follower carriage 156. For example, the feedback system can use proximity sensors, such as capacitive proximity sensors (FIG. 20) and/or inductive proximity sensors (FIGS. 21A-21C).

Figure 20:
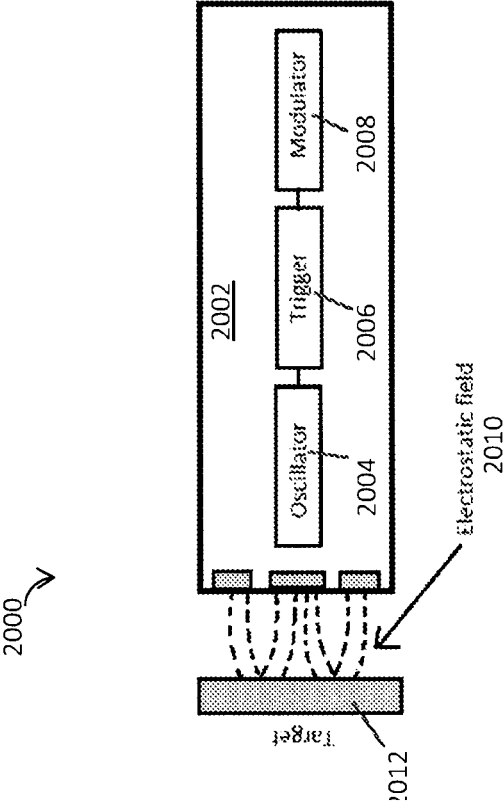
FIG. 20 is a conceptual diagram of a capacitive proximity feedback system for the carriages.

FIG. 20 is a conceptual diagram of a capacitive proximity feedback system 2000 for the carriages (156, 158). The feedback system 2000 includes, without limitation, the following components: a capacitive proximity sensor 2002 and a target 2012. The capacitive proximity sensor 2002 includes, without limitation, an oscillator circuit 2004, a trigger circuit 2006, and a modulator circuit 2008. The feedback system 2000 can be coupled to the top chamber 152, to bottom chamber 154, or to another location of the flow cytometry system 90.

The feedback system 2000 can detect the position, presence, and/or absence of the follower carriage 156. The capacitive proximity sensor 2002 can detect metallic objects and non-metallic objects. A change in capacitance in the sensor 2002 is a measurement of how an object that has moved to be present in the electrostatic field 2010 or absent from the electrostatic field 2010. The change in capacitance is derived by a combination of the oscillator circuit 2004, the trigger circuit 2006, and the modulator circuit 2008. The electrostatic field 2010 generated by concentric conductors is interrupted by the target 2012 (e.g., follower carriage 156) near the concentric conductors. The proximity of the target 2012 changes the capacitance formed by the concentric conductors. Based on the capacitance and/or change in capacitance, the sensor 2002 can detect the proximity of the follower carriage 156.

Figures 21A, 21B, 21C:
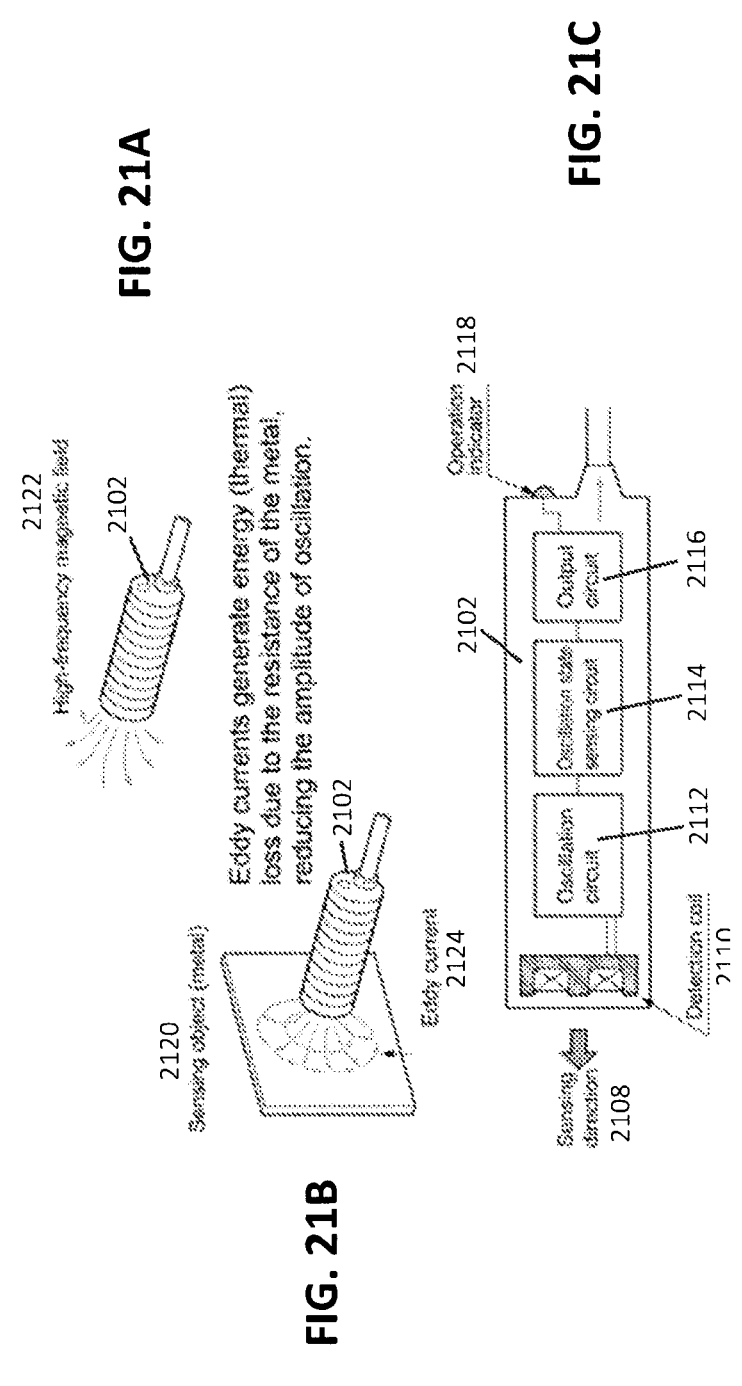
FIGS. 21A-21C are conceptual diagrams of an inductive proximity feedback system for the carriages.

FIGS. 21A-21C are conceptual diagrams of an inductive proximity feedback system 2100 for the carriages (156, 158). The inductive proximity feedback system 2100 includes, without limitation, the following components: an inductive proximity sensor 2102 and a target 2120. The inductive proximity sensor 2102 includes, without limitation, a detection coil 2110, an oscillator circuit 2112, an oscillation state sensing circuit 2114, an output circuit 2116, and an operation indicator 2118. The feedback system 2100 can be coupled to the top chamber 152, to bottom chamber 154, or to another location of the flow cytometry system 90.

The feedback system 2100 can detect the position, presence, and/or absence of the follower carriage 156. The inductive proximity sensor 2102 can detect metallic objects. The sensor 2102 emits a high-frequency magnetic field 2122. The detection coil 2110 of the inductive proximity sensor 2102 detects a target 2120 that is in a sensing direction 2108. Eddy currents 2124 generate energy loss (e.g., thermal energy loss) due to resistance of the metal target 2120. The energy loss reduces the amplitude of oscillation in the oscillation circuit 2110. The oscillation state sensing circuit 2114 senses a change in amplitude of oscillation. The Output circuit 2116 outputs a result and communicates an activity state via the operation indicator 2118.

Advantages

The collecting system 100 uses magnets 302 in the driver carriage 158 to control the position of other magnets 202 in the follower carriage 156. The driver carriage 158 can thereby control the position of the follower carriage 156 without physically touching the follower carriage 156. The magnetically coupled positioning system 100 can have the follower carriage 156 in a vastly different chemical environment than the driver carriage 158 by having the two environments separated by components of the separation plate 166. Such separation may be highly desirable in several situations. For example, the follower carriage 156 may need to be in a temperature-controlled environment, while setting and maintaining the temperature for the driver carriage 158 may not be feasible or desirable. In another example, the follower carriage 156 and its environment may be exposed to harsh chemicals or biologically hazardous materials. In such a situation, the material set and the geometry of the follower carriage 156 along with its immediate/exposed environment can be selected and designed to be tolerant of these hazards. In a traditional system, it is costly to select materials and incorporate designs which can prevent damage to the components of the driver carriage 158. Such damage occurs either directly or by necessitating disinfection and cleaning by using aggressive cleaning chemicals and elaborate procedures. Fortunately, by separating the two environments from each other, the present collecting system 100 can reduce cost and maintenance difficulty. The collecting system 100 is designed to expose only the environment of the follower carriage 156 to the harsh elements (e.g., harsh chemicals, harsh temperatures, harsh biological materials, harsh vapors, etc.).

When implemented in software, the elements of the embodiments of the invention are essentially the program, code segments, or instructions to perform the necessary tasks. The program, code segments, or instructions can be stored in a processor readable medium or storage device that can be read and executed by a processor. The processor readable medium may include any medium that can store information. Examples of the processor readable medium include, without limitation, an electronic circuit, a semiconductor memory device, a read only memory (ROM), a flash memory, an erasable programmable read only memory (EPROM), a floppy diskette, a CD-ROM, an optical disk, and a magnetic disk. The program or code segments may be downloaded via computer networks such as the Internet, Intranet, etc. and stored in the processor readable medium or storage device.

Some portions of the preceding detailed description may have been presented in terms of algorithms and symbolic representations that perform operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities may take the form of electrical (e.g., current or voltage) or magnetic signals capable of being stored, transferred, combined, compared, and otherwise manipulated. It has proven convenient at times, principally for reasons of common usage, to refer to these signals as bits, values, levels, elements, symbols, characters, terms, numbers, or the like.

However, all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, processing logic, or similar electronic computing device, that automatically or semi-automatically manipulates and transforms data represented as physical (electronic) quantities within the computer system's registers and memories into other data similarly represented as physical quantities within the computer system memories or registers or other such information storage, transmission or display devices.

Additionally, the embodiments of the invention are not described with reference to any particular programming language. It will be appreciated that a variety of programming languages may be used to implement the teachings of the embodiments of the invention as described herein.

This disclosure contemplates other embodiments or purposes. It will be appreciated that the embodiments of the invention can be practiced by other means than that of the described embodiments, which are presented in this description for purposes of illustration and not of limitation. The specification and drawings are not intended to limit the exclusionary scope of this patent document. It is noted that various equivalents for the particular embodiments discussed in this description may be practiced by the claimed invention as well. That is, while specific embodiments of the invention have been described, it is evident that many alternatives, modifications, permutations and variations will become apparent in light of the foregoing description. Accordingly, it is intended that the claimed invention embrace all such alternatives, modifications and variations as fall within the scope of the appended claims. The fact that a product, process, or method exhibits differences from one or more of the described exemplary embodiments does not mean that the product or process is outside the scope (literal scope and/or other legally-recognized scope) of the following claims.

What is claimed is:

1. A collecting system for flow cytometry and cell sorter systems, the collecting system comprising:
a driver carriage including one or more driver magnet clusters mounted and fixed on a top side of the driver carriage, wherein each driver magnet cluster includes two or more driver magnets having one or more repelling driver magnets touching one or more attracting driver magnets, wherein the two or more driver magnets are strategically spread out within each driver magnet cluster to enable attracting forces and repelling forces to have adequate strength to perform proper pulling and proper pushing, respectively;
a follower carriage including one or more follower magnet clusters mounted and fixed on a bottom side of the follower carriage, wherein each follower magnet cluster includes two or more follower magnets having one or more repelling follower magnets touching one or more attracting follower magnets, wherein the one or more driver magnet clusters are paired with the one or more follower magnet clusters to make one or more magnet cluster pairs, wherein at least one magnet cluster pair is mounted to have an offset between a follower magnet cluster and a driver magnet cluster of the magnet cluster pair, wherein the offset is configured to have an offset size that reduces a lag between the follower carriage and the driver carriage; and
a microplate removably mounted on the follower carriage and configured to hold wells for receiving sorted biological cells.

2. The collecting system of claim 1, further comprising:
a separation plate physically separating the driver carriage from the follower carriage,
wherein the driver carriage is positioned below the separation plate, and
wherein the follower carriage is positioned above the separation plate.

3. The collecting system of claim 2, further comprising:
a bottom chamber including the driver carriage; and
a top chamber including the follower carriage,
wherein the separation plate physically separates the bottom chamber from the top chamber, and
wherein the separation plate thereby enables the driver carriage and the follower carriage to be in different environments.

4. The collecting system of claim 1, further comprising:
a microplate positioned on a top side of the follower carriage,
wherein the microplate includes a plurality of wells configured to receive a sorting of cells exiting a nozzle of a flow cytometer.

5. The collecting system of claim 1, further comprising:
a positioning stage, wherein the driver carriage is physically coupled to the positioning stage, wherein the positioning stage is coupled to linear motors that are configured to control the position of the positioning stage, and wherein the positioning stage thereby controls the position of the driver carriage.

6. The collecting system of claim 5, further comprising
a spring coupled to the positioning stage and configured to push the driver carriage against a bottom surface of a separation plate.

7. The collecting system of claim 1, wherein
at least one magnet pair between the driver carriage and the follower carriage experiences an attraction force; and
the attraction force coerces the follower carriage to move in the direction of the driver carriage when the driver carriage moves.

8. The collecting system of claim 1, the follower carriage including:
a carriage sleeve;

17 a rubber adapter mounted on the carriage sleeve; and a microplate mounted on the rubber adapter, wherein the rubber adapter helps minimize interference to the microplate.

9. The collecting system of claim 1, the follower carriage including:

one or more flexing arms mounted on the follower carriage, and a microplate mounted on the one or more flexing arms.

10. The collecting system of claim 1, the follower carriage includes:

one or more ball bearings coupled to a bottom side of the follower carriage, wherein the one or more ball bearings are configured to roll on a top surface of a separation plate.

11. The collecting system of claim 1, further comprising:

a push/pull driver magnet arrangement including the driver magnets arranged such that alternating polarities are facing the follower carriage; and a push/pull follower magnet arrangement including the follower magnets arranged such that alternating polarities are facing the driver carriage, wherein one or more magnet pairs have magnets of opposite polarities facing each other, and wherein one or more magnet pairs have magnets of same polarities facing each other.

12. The collecting system of claim 1, wherein the offset size is equal to a lag that tends to occur when the offset is not applied.

13. The collecting system of claim 3, further comprising:

one or more cantilever springs mounted on the bottom chamber, wherein the separation plate is mounted on the cantilever springs.

14. The collecting system of claim 1, further comprising:

a code strip attached to bottom surface of the follower carriage; and a position sensor including a light-emitting diode configured to project light onto the code strip, and a signal processing circuit configured to calculate a position of the follower carriage based on light reflected from the code strip.

15. The collecting system of claim 1, further comprising:

one more Hall effect sensors coupled to the follower carriage, wherein the one or more Hall effect sensors are configured to detect and report relative movement between the driver carriage and the follower carriage.

16. The collecting system of claim 1, further comprising:

a proximity feedback system including a capacitive proximity sensor configured to detect a presence of the follower carriage.

17. The collecting system of claim 1, further comprising:

a proximity feedback system including an inductive proximity sensor configured to detect a presence of the follower carriage.

18. The collecting system of claim 1, further comprising:

one more sliding bumps coupled to a bottom surface of the follower carriage, wherein the one or more sliding bumps include at least one of:

a same material as the bottom surface of the follower carriage, or a different material than the bottom surface of the follower carriage.

19. The collecting system of claim 6, wherein the spring includes at least one of:

a compression coil spring;

an extension spring;

a constant-force drum spring;

18 a gas spring;

a foam rubber spring;

a leaf spring;

a cantilever spring; or a torsion spring.

20. A flow cytometer system comprising:

an excitation optics system configured to project light; and a fluidics system configured to receive the projected light from the excitation optics system, the fluidics system including a cell sorter system having a collecting system that includes a driver carriage including one or more driver magnet clusters mounted and fixed on a top side of the driver carriage, wherein each driver magnet cluster includes two or more driver magnets having one or more repelling driver magnets touching one or more attracting driver magnets, wherein the two or more driver magnets are strategically spread out within each driver magnet cluster to enable attracting forces and repelling forces to have adequate strength to perform proper pulling and proper pushing, respectively, and a follower carriage including one or more follower magnet clusters mounted and fixed on a bottom side of the follower carriage, wherein each follower magnet cluster includes two or more follower magnets having one or more repelling follower magnets touching one or more attracting follower magnets, wherein the one or more driver magnet clusters are paired with the one or more follower magnet clusters to make one or more magnet cluster pairs, wherein at least one magnet cluster pair is mounted to have an offset between a follower magnet cluster and a driver magnet cluster of the magnet cluster pair, wherein the offset is configured to have an offset size that reduces a lag between the follower carriage and the driver carriage.

21. The flow cytometer system of claim 20, wherein the fluidics system further includes:

a collection tray coupled to the follower carriage, the collection tray having a plurality of wells to collect sorted cells or particles of a test sample into different wells of the plurality of wells.

22. A method comprising:

sorting cells or particles of a test sample into different fluid streams;

collecting the different fluid streams into one or more wells of a set of wells in a collection tray held by a microplate removably mounted on a follower carriage; and magnetically moving the collection tray to arrange one or more wells of another set of wells in the collection tray to be under the different fluid streams, wherein the magnetically moving is performed by a driver carriage in cooperation with the follower carriage, wherein the driver carriage includes one or more driver magnet clusters mounted and fixed on a top side of the driver carriage, wherein at least one driver magnet cluster is mounted to have an offset between a follower magnet cluster and the driver magnet cluster, wherein the offset is configured to have an offset size that reduces a lag between the follower carriage and the driver carriage, wherein each driver magnet cluster includes two or more driver magnets having one or more repelling driver magnets touching one or more attracting driver magnets, wherein the two or more driver magnets are strategically spread out within each driver magnet cluster to enable attracting forces and repelling forces to have adequate strength to perform proper pulling and proper pushing, respectively.

23. The method of claim 22, further comprising:

after magnetically moving the collection tray, collecting the different fluid streams into the one or more wells of the another set of wells in the collection tray.

24. The method of claim 22, further comprising:

prior to sorting, coupling the collection tray to a follower carriage; and magnetically coupling the follower carriage to a driver carriage, wherein the follower carriage is physically separated from the driver carriage by a separation plate and wherein the follower carriage and the collection tray are magnetically move together by the driver carriage.

25. The method of claim 22, further comprising:

receiving positional feedback of the magnetic movement of the collection tray to verify the arrangement of the one or more wells in the collection tray is under the different fluid streams.

26. The method of claim 22, further comprising:

receiving positional feedback of the magnetic movement of the follower carriage and the collection tray together to verify the arrangement of the one or more wells in the collection tray is under the different fluid streams.

\* \* \* \* \*